United States Patent
Hasegawa

(10) Patent No.: US 10,353,773 B2
(45) Date of Patent: Jul. 16, 2019

(54) RAID STORAGE SYSTEM, STORAGE CONTROLLER AND RAID ARRAY PATROL METHOD

(71) Applicants: KABUSHIKI KAISHA TOSHIBA, Minato-ku (JP); TOSHIBA DIGITAL SOLUTIONS CORPORATION, Kawasaki-shi (JP)

(72) Inventor: Tomofumi Hasegawa, Inagi (JP)

(73) Assignees: KABUSHIKI KAISHA TOSHIBA, Minato-ku (JP); TOSHIBA DIGITAL SOLUTIONS CORPORATION, Kawasaki-shi (JP)

(*) Notice: Subject to any disclaimer, the term of this patent is extended or adjusted under 35 U.S.C. 154(b) by 312 days.

(21) Appl. No.: 15/333,990

(22) Filed: Oct. 25, 2016

(65) Prior Publication Data

US 2018/0032398 A1    Feb. 1, 2018

(30) Foreign Application Priority Data

Aug. 1, 2016 (JP) .................. 2016-151250

(51) Int. Cl.
*G06F 11/10* (2006.01)
*G06F 3/06* (2006.01)
*G06F 11/00* (2006.01)
*G06F 3/00* (2006.01)

(52) U.S. Cl.
CPC .......... *G06F 11/1076* (2013.01); *G06F 3/064* (2013.01); *G06F 3/0619* (2013.01); *G06F 3/0689* (2013.01)

(58) Field of Classification Search
None
See application file for complete search history.

(56) References Cited

U.S. PATENT DOCUMENTS

| 10,001,947 | B1* | 6/2018 | Chatterjee | ........... G06F 11/1076 |
| 2003/0105922 | A1 | 6/2003 | Tomita | |
| 2005/0117462 | A1 | 6/2005 | Kano et al. | |
| 2005/0283651 | A1 | 12/2005 | Kikuchi | |
| 2009/0157959 | A1* | 6/2009 | Miyazaki | ........... G06F 11/2094 |
| | | | | 711/114 |

(Continued)

FOREIGN PATENT DOCUMENTS

| JP | 2003-167689 A | 6/2003 |
| JP | 2003-303057 | 10/2003 |

(Continued)

*Primary Examiner* — Justin R Knapp
(74) *Attorney, Agent, or Firm* — Oblon, McClelland, Maier & Neustadt, L.L.P.

(57) ABSTRACT

According to one embodiment, a RAID storage system includes a RAID storage device and a storage controller. The RAID storage device includes at least one RAID array. The at least one RAID array has a plurality of stripe groups. The storage controller controls access to the at least one RAID array. The storage controller includes an input/output controller and a patrol controller. The input/output controller executes one of a write access and a read access to a requested stripe group in the at least one RAID array according to an access request from a host device. The patrol controller patrols a stripe group having been subjected to write access, more preferentially than other stripe groups.

8 Claims, 11 Drawing Sheets

(56) References Cited

U.S. PATENT DOCUMENTS

2009/0164844 A1* 6/2009 Tamura ............... G06F 11/1076
                                                        714/25
2011/0197025 A1* 8/2011 Okamoto ........... G11B 20/1879
                                                        711/114
2017/0090778 A1* 3/2017 Ishiguro ................ G06F 3/0611

FOREIGN PATENT DOCUMENTS

| JP | 2006-4078 | 1/2006 |
| JP | 2006-31332 | 2/2006 |
| JP | 2007-128527 A | 5/2007 |
| JP | 2011-164868 | 8/2011 |
| JP | 2013-114311 A | 6/2013 |
| WO | WO 2009/001413 A1 | 12/2008 |

* cited by examiner

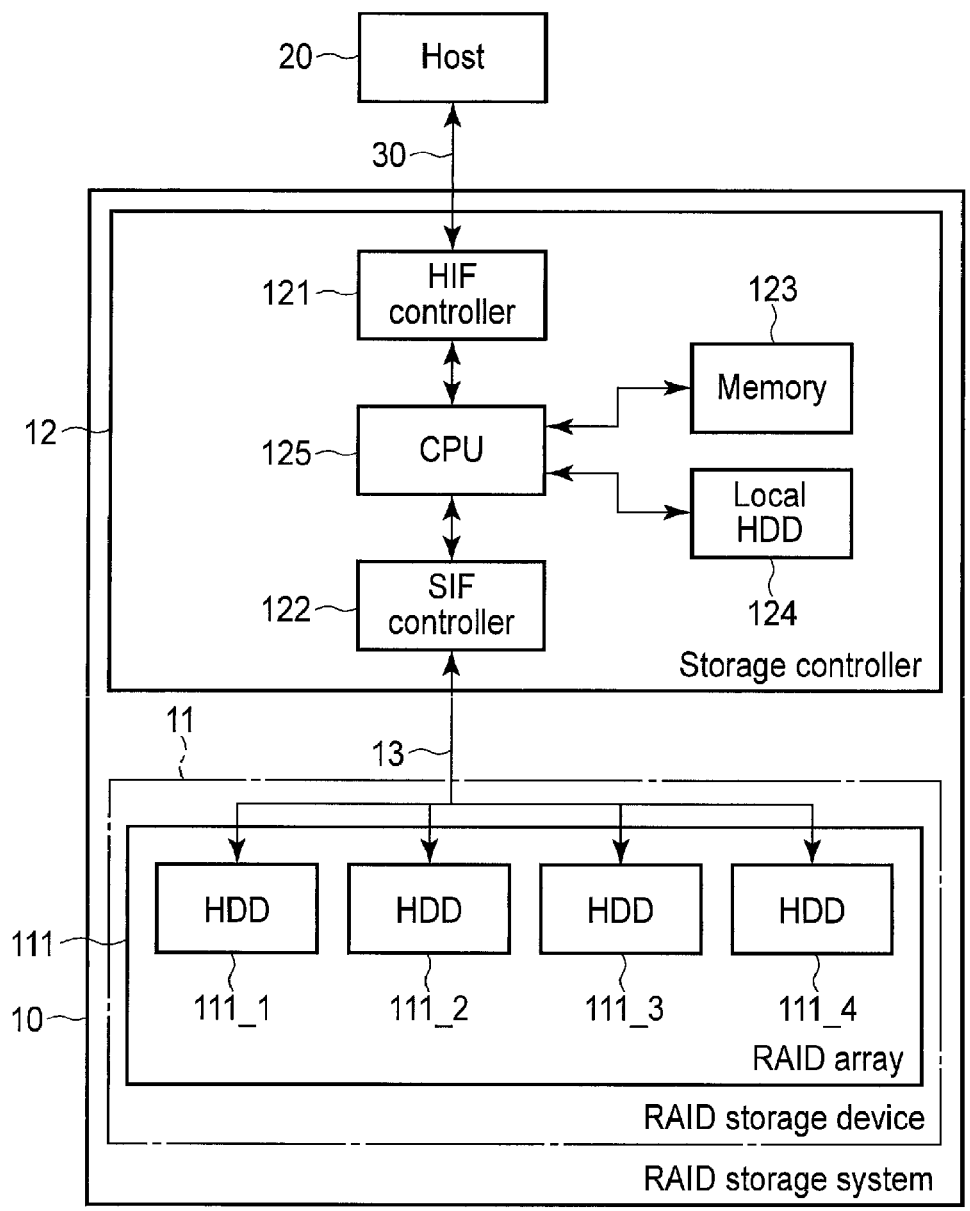
F I G. 1

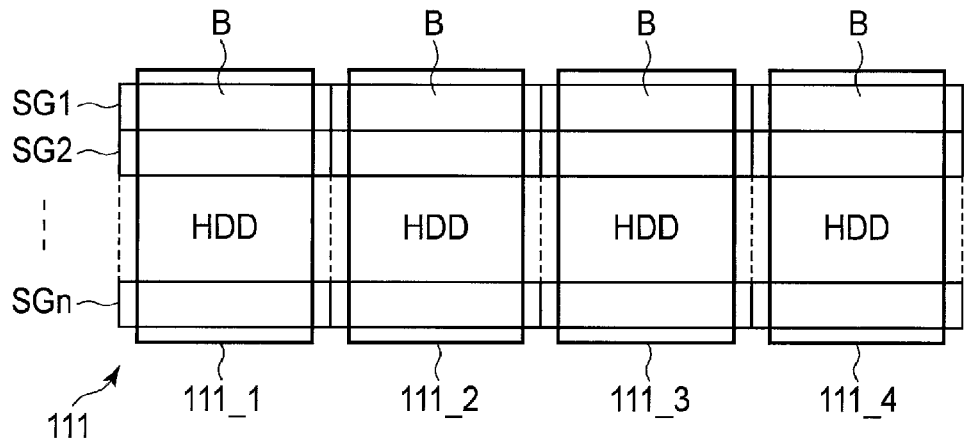
F I G. 2
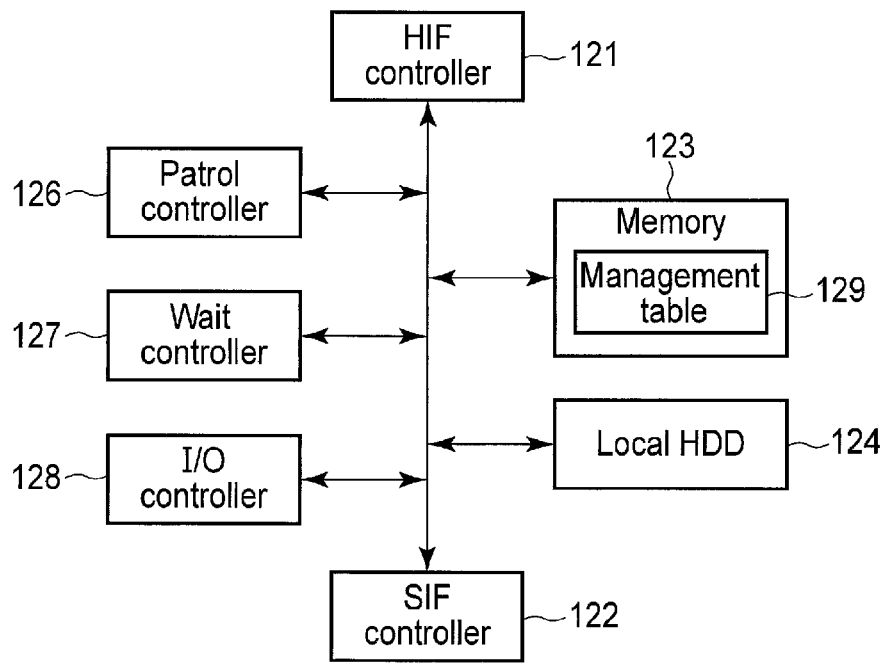
F I G. 3

| Stripe group number (SGN) | Last write time (LWT) | Last read time (LRT) | Patrol status (PS) | Last patrol time (LPT) | Patrol priority (PP) | Write count (WC) |
|---|---|---|---|---|---|---|
| 1 | 00:00:00 | 00:00:00 | S1 | 00:00:00 | SKIP | 0 |
| 2 | 00:00:00 | 00:00:00 | S1 | 00:00:00 | SKIP | 0 |
| 3 | 00:00:00 | 00:00:00 | S1 | 00:00:00 | SKIP | 0 |
| 4 | 00:00:00 | 00:00:00 | S1 | 00:00:00 | SKIP | 0 |
| ... | ... | ... | ... | ... | ... | ... |
| n | 00:00:00 | 00:00:00 | S1 | 00:00:00 | SKIP | 0 |

129

F I G. 4

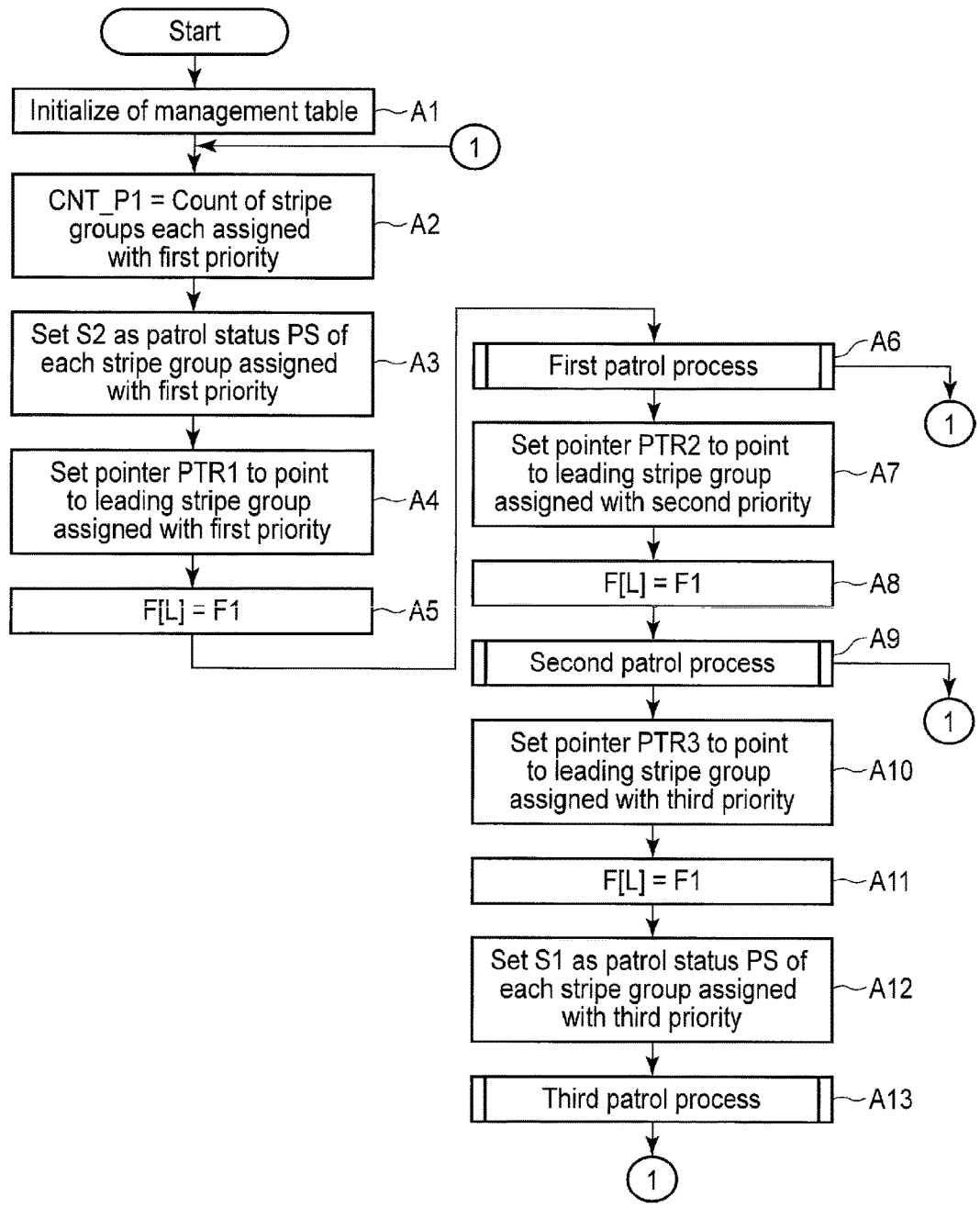
F I G. 5

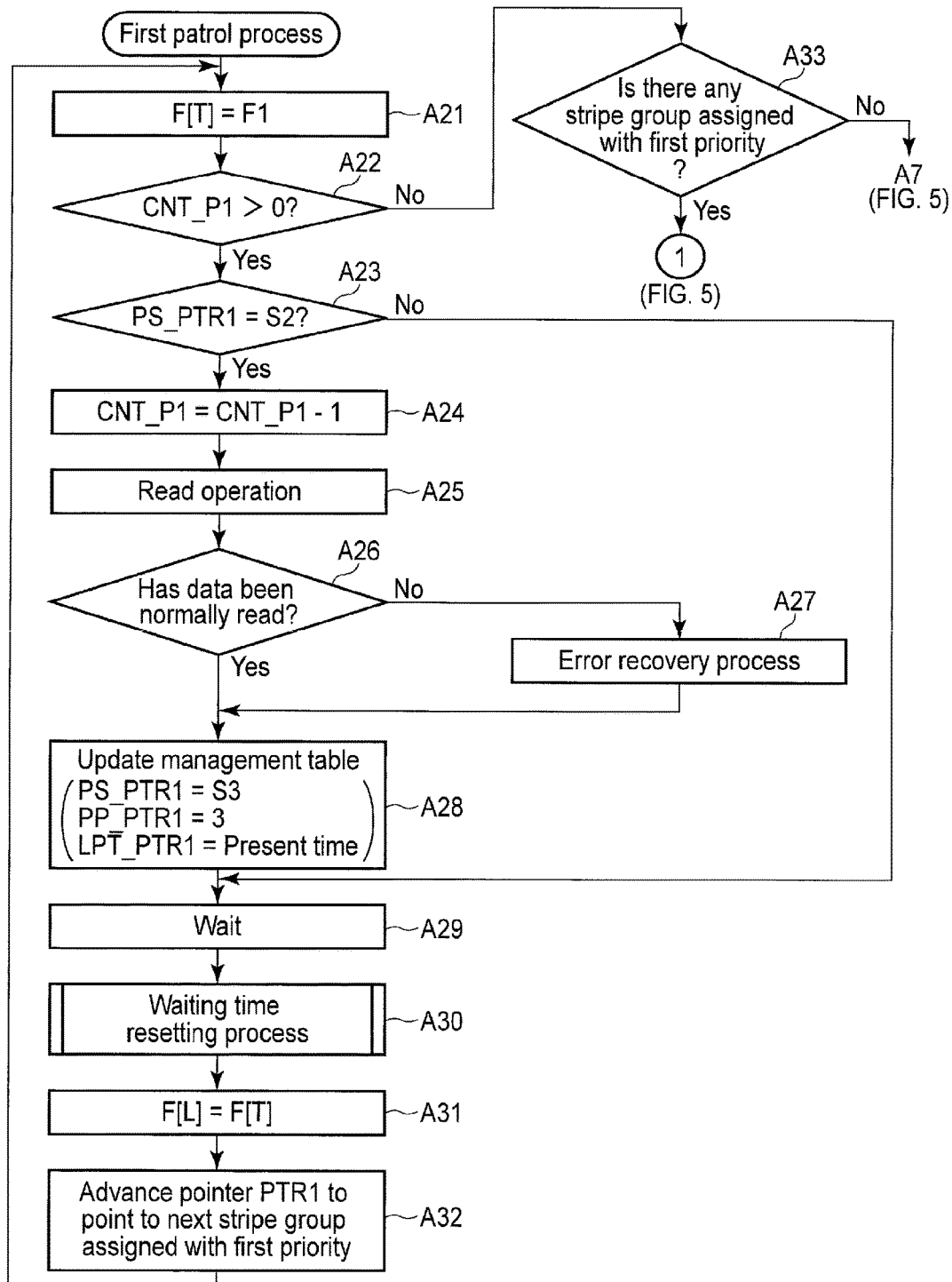
F I G. 6

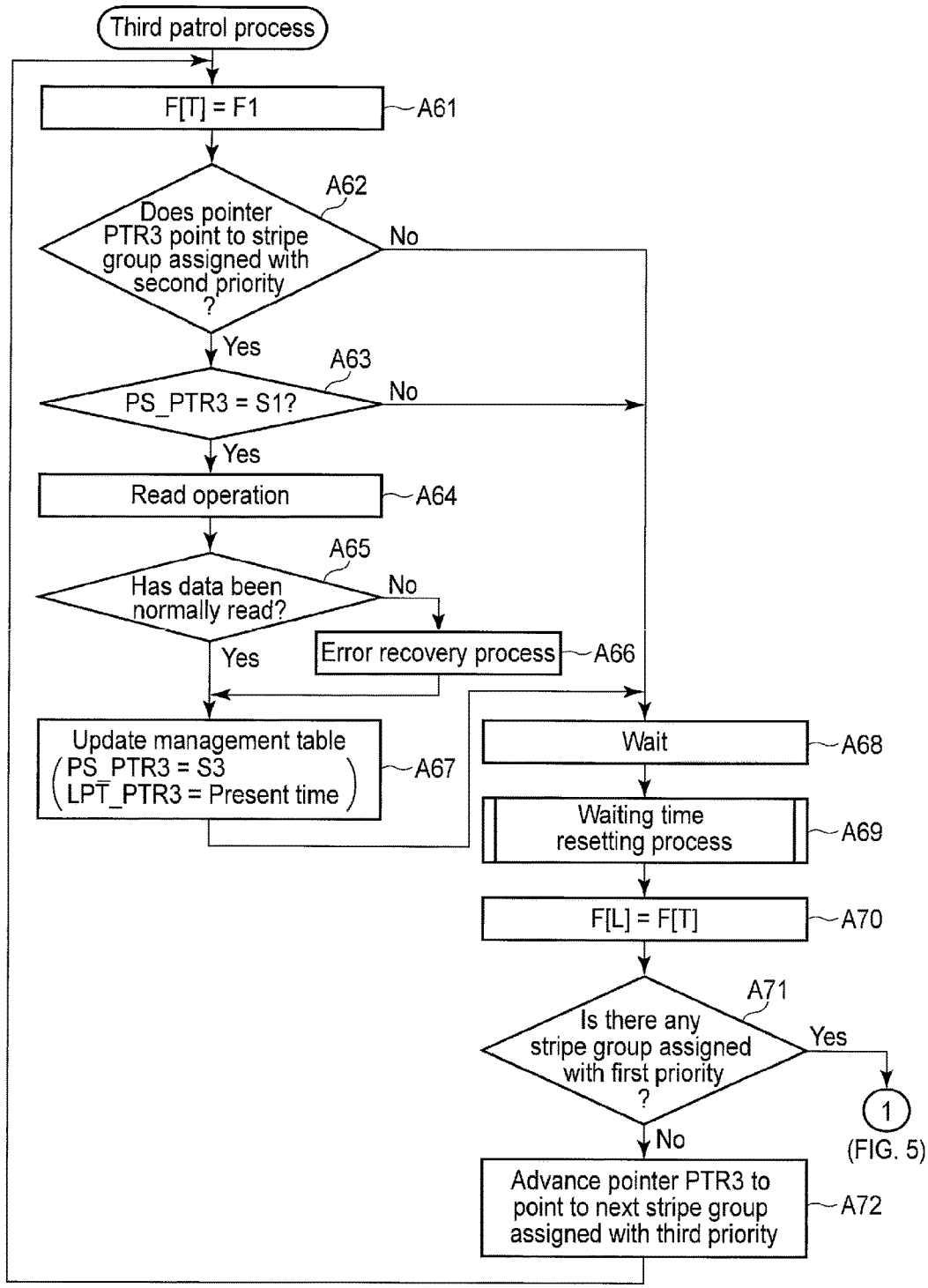
F I G. 8

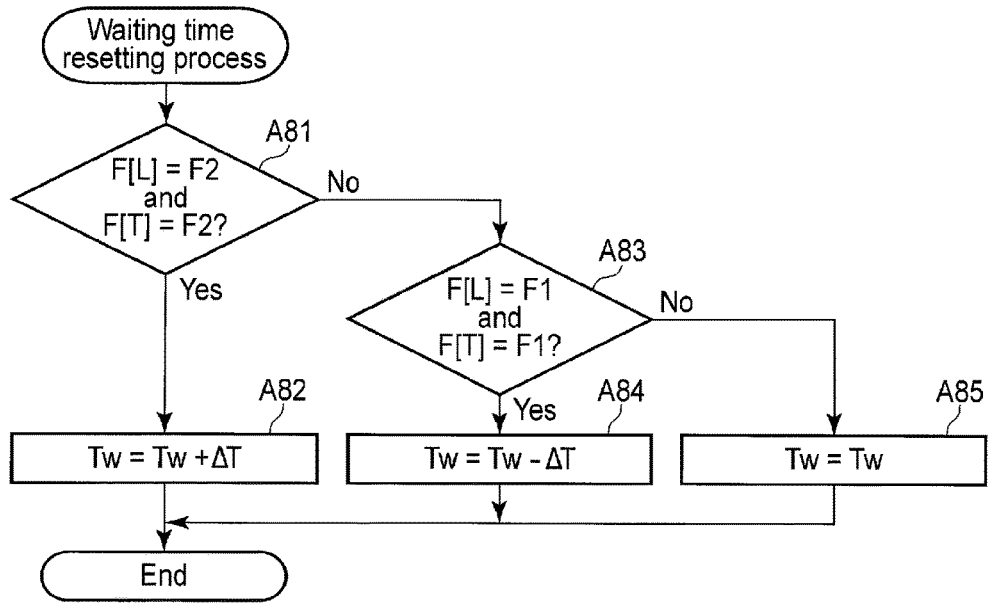
F I G. 9
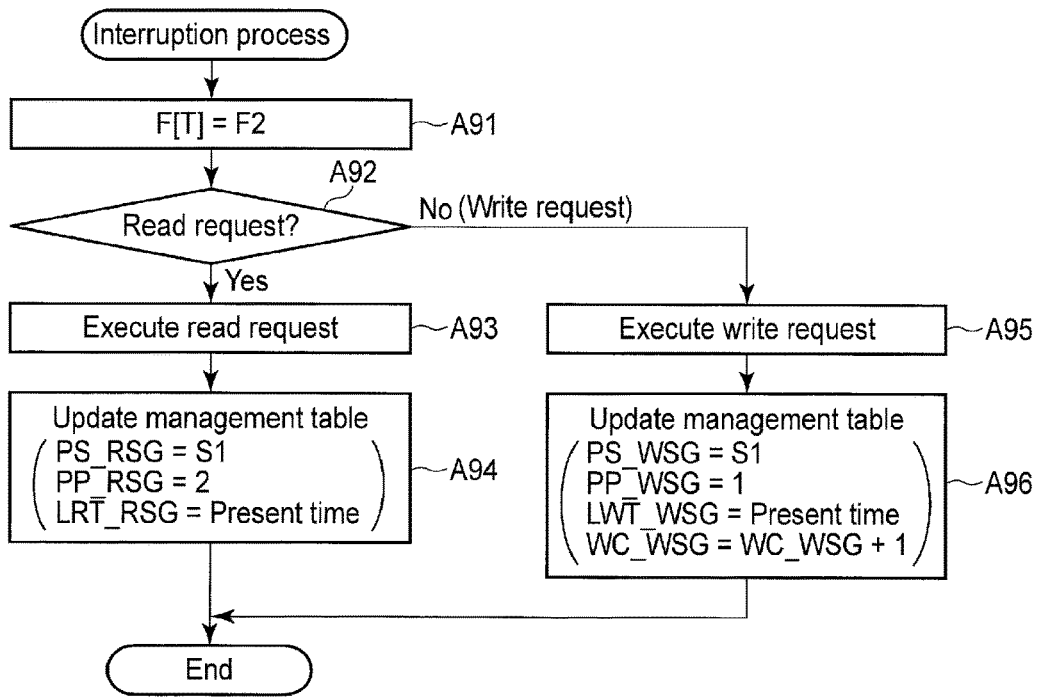
F I G. 10

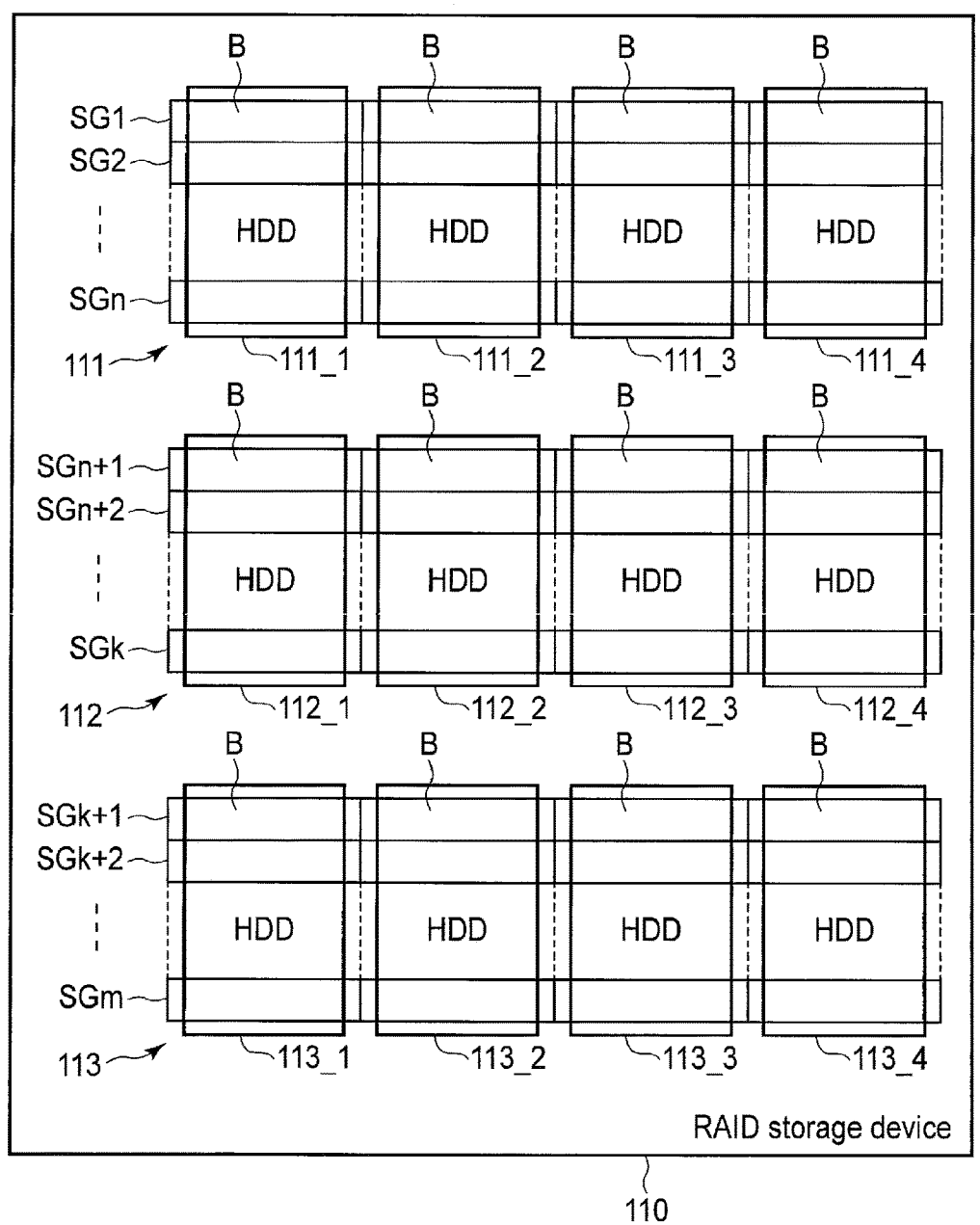
F I G. 11

| RAID array number (RAN) | RAID array priority (RAP) | Stripe group number (SGN) | Last write time (LWT) | Last read time (LRT) | Patrol status (PS) | Last patrol time (LPT) | Patrol priority (PP) | Write count (WC) |
|---|---|---|---|---|---|---|---|---|
| 1 | 1 | 1 | 00:00:00 | 00:00:00 | S1 | 00:00:00 | SKIP | 0 |
| 1 | 1 | 2 | 00:00:00 | 00:00:00 | S1 | 00:00:00 | SKIP | 0 |
| 1 | 1 | 3 | 00:00:00 | 00:00:00 | S1 | 00:00:00 | SKIP | 0 |
| 1 | 1 | 4 | 00:00:00 | 00:00:00 | S1 | 00:00:00 | SKIP | 0 |
| 1 | ... | ... | ... | ... | ... | ... | ... | ... |
| 1 | 1 | n | 00:00:00 | 00:00:00 | S1 | 00:00:00 | SKIP | 0 |
| 2 | 3 | n+1 | 00:00:00 | 00:00:00 | S1 | 00:00:00 | SKIP | 0 |
| 2 | 3 | n+2 | 00:00:00 | 00:00:00 | S1 | 00:00:00 | SKIP | 0 |
| 2 | 3 | n+3 | 00:00:00 | 00:00:00 | S1 | 00:00:00 | SKIP | 0 |
| 2 | 3 | n+4 | 00:00:00 | 00:00:00 | S1 | 00:00:00 | SKIP | 0 |
| 2 | ... | ... | ... | ... | ... | ... | ... | ... |
| 2 | 3 | k | 00:00:00 | 00:00:00 | S1 | 00:00:00 | SKIP | 0 |
| 3 | 2 | k+1 | 00:00:00 | 00:00:00 | S1 | 00:00:00 | SKIP | 0 |
| 3 | 2 | k+2 | 00:00:00 | 00:00:00 | S1 | 00:00:00 | SKIP | 0 |
| 3 | 2 | k+3 | 00:00:00 | 00:00:00 | S1 | 00:00:00 | SKIP | 0 |
| 3 | 2 | k+4 | 00:00:00 | 00:00:00 | S1 | 00:00:00 | SKIP | 0 |
| 3 | ... | ... | ... | ... | ... | ... | ... | ... |
| 3 | 2 | m | 00:00:00 | 00:00:00 | S1 | 00:00:00 | SKIP | 0 |

1291

F I G. 12

| RAID array number (RAN) | RAID array priority (RAP) | Stripe group number (SGN) | Last write time (LWT) | Last read time (LRT) | Patrol status (PS) | Last patrol time (LPT) | Patrol priority (PP) | Write count (WC) | Error count (EC) |
|---|---|---|---|---|---|---|---|---|---|
| 1 | 1 | 1 | 00:00:00 | 00:00:00 | S1 | 00:00:00 | SKIP | 0 | 0 |
| 1 | 1 | 2 | 00:00:00 | 00:00:00 | S1 | 00:00:00 | SKIP | 0 | 0 |
| 1 | 1 | 3 | 00:00:00 | 00:00:00 | S1 | 00:00:00 | SKIP | 0 | 0 |
| 1 | 1 | 4 | 00:00:00 | 00:00:00 | S1 | 00:00:00 | SKIP | 0 | 0 |
| ... | ... | ... | ... | ... | ... | ... | ... | ... | ... |
| 1 | 1 | n | 00:00:00 | 00:00:00 | S1 | 00:00:00 | SKIP | 0 | 0 |
| 2 | 3 | n+1 | 00:00:00 | 00:00:00 | S1 | 00:00:00 | SKIP | 0 | 0 |
| 2 | 3 | n+2 | 00:00:00 | 00:00:00 | S1 | 00:00:00 | SKIP | 0 | 0 |
| 2 | 3 | n+3 | 00:00:00 | 00:00:00 | S1 | 00:00:00 | SKIP | 0 | 0 |
| 2 | 3 | n+4 | 00:00:00 | 00:00:00 | S1 | 00:00:00 | SKIP | 0 | 0 |
| ... | ... | ... | ... | ... | ... | ... | ... | ... | ... |
| 2 | 3 | k | 00:00:00 | 00:00:00 | S1 | 00:00:00 | SKIP | 0 | 0 |
| 3 | 2 | k+1 | 00:00:00 | 00:00:00 | S1 | 00:00:00 | SKIP | 0 | 0 |
| 3 | 2 | k+2 | 00:00:00 | 00:00:00 | S1 | 00:00:00 | SKIP | 0 | 0 |
| 3 | 2 | k+3 | 00:00:00 | 00:00:00 | S1 | 00:00:00 | SKIP | 0 | 0 |
| 3 | 2 | k+4 | 00:00:00 | 00:00:00 | S1 | 00:00:00 | SKIP | 0 | 0 |
| ... | ... | ... | ... | ... | ... | ... | ... | ... | ... |
| 3 | 2 | m | 00:00:00 | 00:00:00 | S1 | 00:00:00 | SKIP | 0 | 0 |

F I G. 13

RAID STORAGE SYSTEM, STORAGE CONTROLLER AND RAID ARRAY PATROL METHOD

CROSS-REFERENCE TO RELATED APPLICATIONS

This application is based upon and claims the benefit of priority from Japanese Patent Application No. 2016-151250, filed Aug. 1, 2016, the entire contents of which are incorporated herein by reference.

FIELD

Embodiments described herein relate generally to a RAID storage system, a storage controller, and a RAID array patrol method.

BACKGROUND

A RAID storage system has been conventionally known. The RAID storage system includes a RAID storage device and a storage controller. The RAID storage device includes at least one RAID array which has a configuration called Redundant Arrays of Independent Disks (RAID) (RAID configuration). Generally, a RAID array is formed using a plurality of hard disk drives (HDD's).

The storage controller controls access to any RAID array. Further, when a failure occurs in any one of the HDD's in one of the RAID arrays, the storage controller performs operation for restoring data held in the failed HDD based on data held in the remaining HDD's (what is called a rebuilding operation).

However, if any data cannot be normally read from any of the remaining HDD's because of an error such as a medium error, the storage controller cannot perform the rebuilding operation. That is, the storage controller cannot restore the RAID configuration in the RAID array. In such a case, the RAID array is in a multiple failure, in which at least two HDD's are in failure.

In order to avoid such a multiple failure, the storage controller patrols, using read operation, all the storage areas of all the HDD's which form a RAID array. It is the patrol that makes it possible for the storage controller to detect a medium error in advance, for example. In recent years, any HDD in any RAID array tends to increase in capacity, so that the time required to patrol any HDD (in any RAID array) also tends to substantially increase.

On the other hand, as an HDD is made to have a greater capacity, a phenomenon called weak write tends to easily occur. The term "weak write" refers to a phenomenon that some factors or other suddenly make the flying height of a head higher while the head is used for writing data on a medium (disk) of an HDD, because of which the medium will be partially insufficient in magnetization. The term "weak write" also refers to a further phenomenon that data cannot be normally read from a portion of the medium that is insufficiently magnetized at write operation as has been just mentioned. Minute particles on the medium may be enumerated as one of the factors of weak write. That is, particles may enter between a head and a medium, and may cause the flying height of the head higher, resulting in occurrence of weak write.

Medium errors caused by weak writes may be detected and restored by the above-mentioned patrol. However, as time taken by a patrol increases with enlargement in capacity of an HDD, time until a medium error is detected will also be extended. Then, it is highly possible that a RAID array may get into a multiple failure, because a medium error may occur in any one of the HDD's in the RAID array while some other one of the HDD's in the RAID array is yet subjected to a patrol to detect a medium error.

BRIEF DESCRIPTION OF THE DRAWINGS

FIG. 1 is a block diagram illustrating an exemplary hardware configuration of a computer system including a RAID storage system according to one embodiment.

FIG. 2 is a view illustrating an exemplary RAID configuration of a RAID storage device illustrated in FIG. 1.

FIG. 3 is a block diagram mainly illustrating an exemplary functional configuration of a storage controller illustrated in FIG. 1.

FIG. 4 a view illustrating a data structure example of a link management table illustrated in FIG. 3.

FIG. 5 is a flowchart illustrating an exemplary procedure of a patrol process used in the embodiment.

FIG. 6 is a flowchart illustrating an exemplary procedure of a first patrol process included in the patrol process illustrated in FIG. 5.

FIG. 8 is a flowchart illustrating an exemplary procedure of a third patrol process included in the patrol process illustrated in FIG. 5.

FIG. 9 is a flowchart illustrating an exemplary procedure of a waiting time resetting process included in each of the first through the third patrol process.

FIG. 10 is a flowchart illustrating an exemplary procedure of an interruption process used in the embodiment.

FIG. 11 is a view illustrating an exemplary RAID configuration of a RAID storage device used in a first and a second modification of the embodiment.

FIG. 12 is a view illustrating a data structure example of a management table used in the first modification.

FIG. 13 is a view illustrating a data structure example of a management table used in the second modification.

DETAILED DESCRIPTION

Figure 7:
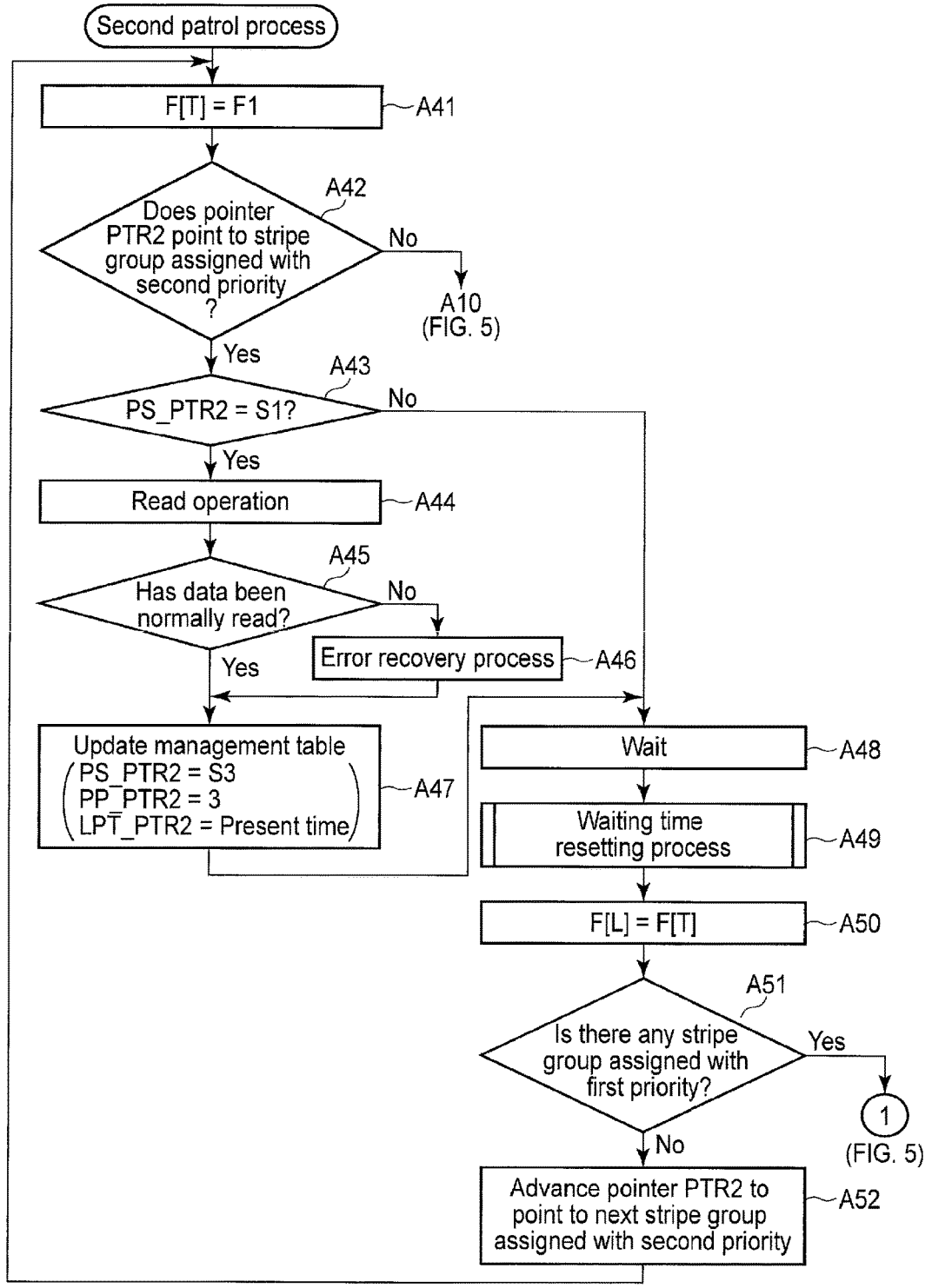
FIG. 7 is a flowchart illustrating an exemplary procedure of a second patrol process included in the patrol process illustrated in FIG. 5.

Various embodiments will be described hereinafter with reference to the accompanying drawings.

In general, according to one embodiment, a RAID storage system comprises a RAID storage device and a storage controller. The RAID storage device includes at least one RAID array having a plurality of stripe groups. Each of the stripe groups comprises a set of a plurality of blocks including a redundant block. The storage controller controls access to the at least one RAID array. The storage controller comprises an input/output controller and a patrol controller. The input/output controller executes one of a write access and a read access to a requested stripe group in the at least one RAID array according to an access request from a host device using the RAID storage device. The patrol controller patrols, using read operation, a stripe group having been subjected to write access preferentially earlier than other stripe groups. Upon completion of patrolling the stripe group preferentially earlier than the other stripe groups, the patrol controller lowers a patrol priority indicative of order to be preferentially patrolled and assigned to the stripe group having been patrolled preferentially earlier than the other stripe groups.

FIG. 1 is a block diagram illustrating an exemplary hardware configuration of a computer system including a RAID storage system according to one embodiment. The computer system illustrated in FIG. 1 includes a RAID storage system 10 and a host computer (hereinafter referred to as a host) 20. That is, the computer system includes a single host. However, it is possible that the computer system may include a plurality of hosts.

The host 20 is a physical computer, such as a server or a client personal computer, and uses the RAID storage system 10 (more specifically, a RAID storage device 11 in the RAID storage system 10) as an own external storage device. The host 20 is connected to the RAID storage system 10 (more specifically, a storage controller 13 in the RAID storage system) through, for example, a host interface bus 30. In the embodiment, the host interface bus 30 is a Fibre Channel (FC). However, it is possible that the host interface bus 30 may be an interface bus other than FC, such as Small Computer System Interface (SCSI), Serial Attached SCSI (SAS), Internet SCSI (iSCSI), Ethernet (Registered Trademark), or Serial AT Attachment (SATA). Moreover, the host 20 may be connected to the RAID storage system 10 through a network, such as a storage area network (SAN), the Internet, or an intranet.

The RAID storage system 10 includes the RAID storage device 11 and a storage controller 12. The RAID storage device 11 is connected to the storage controller 12 through a storage interface bus 13. In the embodiment, the storage interface bus 13 is Fibre Channel (FC). However, it is possible that the storage interface bus 13 may be an interface bus other than FC, like the host interface bus 30.

The RAID storage device 11 includes a RAID array 111 having a RAID configuration, for example. The RAID array 111 is also called a RAID group, and is formed of a plurality of hard disk drives (HDD's), for example, a set of four HDD's 111_1 to 111_4.

The storage controller 12 receives, from the host 20, a request of access (read access or write access) using a logical address (I/O request), and executes the requested access (input/output). For the execution of the access, the storage controller 12 uses a well-known address translation table and translates the logical address into a physical address. The logical address indicates an address which a logical unit including a virtualized storage area has. A storage area (physical storage area) included in the RAID storage device 11 is allocated to the virtualized storage area. The physical address indicates a physical position of a storage area included in the RAID storage device 11 and associated with the logical address. The storage controller 12 accesses the RAID storage device 11 (more, specifically, a stripe group in the RAID array 111 of the RAID storage device 11) based on the physical address.

The storage controller 12 includes a host interface controller (hereinafter referred to as an HIF controller) 121, a storage interface controller (hereinafter referred to as an SIF controller) 122, a memory 123, a local HDD 124 and a CPU 125. The HIF controller 121 controls data transfer (a data transfer protocol) between the HIF controller 121 and the host 20. The HIF controller 121 receives an access request from the host, and replies a response to the access request. The access request designates a data read or a data write. Upon receiving the access request from the host 20, the HIF controller 121 transmits the access request to the CPU 125. The CPU 125 having received the access request processes the access request.

The SIF controller 122 receives, from the CPU 125, an access command (more specifically, a read command or a write command with respect to the RAID storage device 11) corresponding to the access request which the CPU 125 has received from the host 20. The SIF controller 122 accesses the RAID storage device 11 in accordance with the received access command.

The memory 123 is a rewritable volatile memory, such as a DRAM. The memory 123 has a storage area, a part of which is used for at least partly storing a control program loaded from the local HDD 124. Another part of the storage area of the memory 123 is used to store a management table 129 (see FIG. 4) loaded from the HDD 134. Yet another part of the storage area of the memory 123 is used for a work area for the CPU 125.

The local HDD 124 stores the control program. The CPU 125 executes an initial program loader (IPL) when the storage controller 12 is started, and loads into the memory 123 at least a part of the control program stored in the local HDD 124. The IPL is stored in a nonvolatile memory, such as a ROM or a flash ROM.

The CPU 125 is a processor such as a microprocessor. The CPU 125 functions as a patrol controller 126, a wait controller 127, and an input/output (I/O) controller 128 (FIG. 3) in accordance with the control program loaded into the memory 123. That is, the CPU 125 controls the whole RAID storage system 10 by executing the control program stored in the memory 123. Alternatively, it is possible that at least one of the patrol controller 126, the wait controller 127, and the I/O controller 128 may be implemented by hardware.

In the embodiment, the storage controller 12 is provided independently of the host 20 as illustrated in FIG. 1. However, it is possible that the storage controller 12 may be built in the host 20. In such a case, the storage controller 12 (more specifically, the function of the storage controller 12) may be implemented using a part of the function performed by an operating system (OS) which the host 20 has.

The storage controller 12 may be provided in a card to be inserted for use into a car slot provided to the host 20. Alternatively, the storage controller 12 may be partially built in the host 20, and the rest of the storage controller 12 may be provided in the card. Furthermore, it is possible that the host 20, the storage controller 12, and parts or all of the RAID storage devices 11 may be housed in a single housing.

FIG. 2 illustrates an exemplary RAID configuration of the RAID storage device 11 (more, specifically, a RAID array 111 in the RAID storage device 11). As mentioned above, the RAID array 111 of the RAID storage device 11 includes HDD's 111_1 to 111_4. The HDD's 111_1 to 111_4 have their respective storage areas, each of which is divided into small areas called blocks B's for management. Each of the blocks B's is also called a stripe. It is assumed in the embodiment that the HDD's 111_1 to 111_4 are the same in storage area size (i.e., storage capacity) and in block size. Each block B in any HDD 111_i (i=1, 2, 3, 4) has a block number as an identifier for identification of itself.

For example, the RAID array 111 includes stripe groups SG1 through SGn. Any stripe group SGj (j=1, 2, . . . , n) includes a set of blocks B's, each having a block number j and each included in a corresponding one of the HDD's 111_1 to 111_4. That is, any stripe group SGj spreads over the HDD 111_1 to the HDD 111_4. Let us suppose in the embodiment that any block number assigned to any of the blocks B's shall be a logical identifier (logical block address), and shall not indicate any physical position in any HDD 111_i which includes the block concerned.

Furthermore, let us suppose here that RAID 5 (RAID level 5) is applied to the RAID array 111. In this case, any stripe group SGj includes one block which is used as a redundant block for storing redundant data (for example, a parity block for storing parity data), and three remaining blocks which are used as data blocks for storing data. In RAID 5, redundant blocks are regularly distributed among the HDD's 111_1 to 111_4 stripe group by stripe group. Furthermore, if each stripe group SGj in the RAID array 111 includes at least one redundant block, the RAID array 111 may have a RAID configuration other than RAID 5, such as RAID 1, RAID 4, or RAID 6.

FIG. 3 is a block diagram mainly illustrating an exemplary functional configuration of the storage controller 12 illustrated in FIG. 1. The storage controller 12 includes the patrol controller 126, the wait controller 127, and the I/O controller 128.

The patrol controller 126 patrols the RAID array 111 stripe group by stripe group in order to detect as early as possible any failure in any of the blocks B's in the stripe groups SG1 through SGn in the RAID array 111. In the embodiment, the stripe groups SG1 through SGn are assigned with their respective patrol priorities, which will be described later in detail. The patrol controller 126 patrols the stripe groups SG1 through SGn in accordance with the respective patrol priorities.

The wait controller 127 adjusts a waiting time Tw to changes of a state in which an interruption process falls, for example. The interruption process includes an access operation executed in accordance with an access request from the host 2, and is executed during the waiting time Tw. The waiting time Tw indicates a period of time for making a process concerning patrolling to be kept waiting stripe group by stripe group so that the process concerning patrolling may not delay the interruption process (access operation). The operation in which the patrol controller 126 waits the process concerning patrolling for a time Tw is called a wait operation.

The wait controller 127 manages a state, in which the interruption process falls, using two interruption flags F[L] and F[T]. Interruption flags F[L] and F[T] are stored in, for example, a work area which the memory 123 has. Interruption flag F[L] is set to either first state F1 or second state F2. The initial state of interruption flag F[L] is F1. Interruption flag F[L] indicates whether at least one interruption process (access operation) has occurred (F[L]=F2) or not (F[L]=F1) during the last wait operation. Interruption flag F[T] is also set to either first state F1 or second state F2. The initial state of interruption flag F[T] is F1. Interruption flag F[T] indicates whether at least one interruption process has occurred (F[T]=F2) or not (F[T]=F1) during the present wait operation.

The I/O controller 128 executes the interruption process in response to, for example, an interruption based on an access request from the host 20. The interruption process includes execution of the requested access (input and output).

FIG. 4 illustrates a data structure example of the management table 129 illustrated in FIG. 3. The management table 129 has entries associated with respective stripe groups SG1 through SGn in the RAID storage device 11 (RAID array 111), for example. Each of the entries of the management table 129 includes: a stripe group number field, a last write time field, a last read time field, a patrol status field, a last patrol time field, a patrol priority field, and a write count field. Hereafter, these fields included in an entry of the management table 129 associated with stripe group SGj will be explained one by one.

The stripe group number field is used for holding stripe group number SGN (=j) assigned to stripe group SGj. The last write time field is used for holding information indicative of a time (the last write time) LWT when data has been last written to stripe group SGj. The last read time field is used for holding information indicative of a time (the last read time) LRT when data has been last read from stripe group SGj. It should be noted that time/date information may be used instead of time information.

The patrol status field is used for holding information indicative of a status (patrol status) PS which stripe group SGj has in relation to patrolling. The patrol status PS is any one of S1 to S3 (a first to a third status).

S1 indicates that stripe group SGj is not yet patrolled. S2 also indicates that stripe group SGj is not yet patrolled. The difference between S1 and S2 will be described later. S3 indicates that stripe group SGjl has already been patrolled.

The last patrol time field is used for holding information indicative of a time (last patrol time) LPT when stripe group SGj has been last patrolled.

The patrol priority field is used for holding information indicative of priority (patrol priority) PP which is assigned to stripe group SGj and concerns execution of patrolling of stripe group SGj. In the embodiment, the patrol priority PP is any one of a first priority, a second priority and a third priority.

The first priority to the third priority are respectively indicated by a mark 1 to a mark 3. The first priority indicates the highest patrol priority. The second priority indicates the second highest patrol priority. The third priority indicates the lowest patrol priority.

In the embodiment, when the management table 129 is initialized, information indicative of absence of priority is set in place of information indicative of patrol priority PP. The information indicative of absence of priority is specified by a symbol SKIP in FIG. 4, and indicates that patrol priority PP is not yet determined and stripe group SGj is excluded from a target of patrol.

In this way, absence of priority does not necessarily indicate patrol priority PP unlike the first through the third priority. However, it is possible to consider that absence of priority belongs to patrol priority PP (a special case). In such a case, patrol priority PP assigned to stripe group SGj (hereinafter referred to as "PP_SGj") may have a symbol SKIP as its initial value.

When data is written to stripe group SGj, the first priority is set as patrol priority PP_SGj regardless of the present state. That is, the first priority is assigned to stripe group SGj. Moreover, when data is read from stripe group SGj, the second priority is set as patrol priority PP_SGj regardless of the present state. That is, the second priority is assigned to stripe group SGj.

When stripe group SGj (a first stripe group) is patrolled in a state where it is assigned with the first or the second priority, patrol priority PP_SGj is set (changed) to the third priority in response to completion of the patrolling. Moreover, when stripe group SGj is patrolled in a state where it is assigned with the third priority, patrol priority PP_SGj is kept in the third priority even after completion of the patrolling.

When stripe group SGj is in its initial state, S1 is set as patrol status PS of stripe group SGj (hereafter referred to as "stripe group patrol status PS_SGj"). When data is read from stripe group SGj, or when data is written to stripe group SGj, S1 is also set as stripe group patrol status PS_SGj.

In the embodiment, when first priorities are assigned to one or more third stripe groups before patrolling of one or more second stripe groups assigned with the first priorities has been completed, the patrol controller 126 first patrols all the second stripe groups, and then patrols the third stripe groups. Accordingly, the third stripe groups (i.e., stripe groups which are subjected to later performed write access) are prevented from being patrolled ahead of the second stripe groups (i.e., stripe groups which are subjected to previously performed access). For controlling patrol order, second status S2 is used as the patrol status PS in addition to first status S1 as mentioned above. Only stripe group SGj assigned with the first priority can take S2. Specifically, the patrol controller 126 patrols the second stripe groups, each assigned with the first priority and having S1 as its patrol status PS, in order of, for example, stripe group number, after the patrol controller 126 has changed respective patrol status PS of all the second stripe groups from S1 to S2.

Accordingly, the patrol controller 126 can preferentially patrol the second stripe groups, each of which is assigned with the first priority and has S2 as its patrol status PS. S1 indicates, when stripe group SGj is assigned with the first priority, that stripe group SGj is not yet patrolled and is in a state of waiting to be patrolled (a patrol waiting state). In contrast, S2 indicates, when stripe group SGj is assigned with the first priority, that stripe group SGj is not yet patrolled and is in a state of being released from waiting to be patrolled (i.e., a state of being able to be patrolled).

The write count field is used for holding a count (write count) WC indicative of how many times data is written to stripe group SGj.

Now, a patrol process in the embodiment will be explained with reference to FIG. 5. FIG. 5 is a flowchart illustrating an exemplary procedure of the patrol process. First of all, the patrol controller 126 initializes the management table 129 as follows (Step A1).

The patrol controller 126 sets initial values in the respective entries of the management table 129 (namely, entries associated with respective stripe groups SG1 through SGn). Specifically, the patrol controller 126 sets, for every entry, 00:00:00 as an initial value of each of the last write time field, the last read time field, and the last patrol time field for the last write time LWT, the last read time LRT, and the last patrol time LPT. Moreover, the patrol controller 126 set S1, indicative of that patrolling is not yet executed, as an initial value of the patrol status PS in the patrol status field of each entry of the management table 129.

Moreover, the patrol controller 126 sets SKIP indicative of absence of priority (exemption from patrolling) in the patrol priority field of each entry of the management table 129. The patrol controller 126 further sets 0 in the write count field of each entry of the management table 129 as an initial value of the write count WC. Thus, the patrol controller 126 completes initialization of the management table 129 (Step A1). FIG. 4 illustrates a data structure example of the management table 129 at the time when the initialization has been completed.

It is assumed in the embodiment that stripe group numbers 1 through n are preset in the respective stripe group fields of the entries of the management table 129 (namely, entries associated with respective stripe groups SG1 through SGn). However, it is possible that stripe group numbers 1 through n may be set by initialization of the management table 129 (Step A1).

Subsequently, the patrol controller 126 advances to Step A2. In Step A2, the patrol controller 126 refers to the respective patrol priority fields of all the entries of the management table 129. The patrol controller 126 counts the number of stripe groups, each having the first priority as its patrol priority PP, and sets the obtained number as an initial value of count CNT_P1. Count CNT_P1 indicates the number of stripe groups to be patrolled with the highest priority in the patrol process. Immediately after initialization of the management table 129, count CNT_P1 is set to 0.

Subsequently, the patrol controller 126 sets S2, as the patrol status PS, in the patrol status field of each entry of the management table 129, which is associated with a stripe group having the first priority as the patrol priority PP (Step A3). That is, the patrol controller 126 changes, from S1 to S2, the patrol status PS which every stripe group assigned with the first priority has. S2 indicates that a stripe group assigned with the first priority is not yet patrolled and is in a state of being released from waiting to be patrolled.

Step A3 is executed in order to distinguish a stripe group, which has been already assigned with the first priority at the time when stripe groups assigned with the first priorities are subjected to a below-explained first patrol process, from a stripe group, which is assigned with the first priority after the first patrol process has been started. This distinction makes it possible for the patrol controller 126 to patrol stripe groups, which have been already assigned with their respective first priorities before the first patrol process has been started, preferentially earlier than those other stripe groups that are assigned with their respective first priorities after the first patrol process has been started.

Moreover, the patrol controller 126 sets pointer PTR1 to point to a leading stripe group included in the stripe groups which are assigned with the first priorities (Step A4). In the embodiment, the patrol controller 126 determines, as the leading stripe group, a stripe group which is the smallest in stripe group number SGN among the stripe groups assigned with the first priorities.

The patrol controller 126 passes control to the wait controller 127 after having executed Step A4. However, if variable CNT_P1 is 0, that is, if there exists no stripe group assigned with the first priority, the patrol controller 126 passes control to the wait controller 127 without substantially executing Steps A3 and A4.

In response, the wait controller 127 sets flag F[L] to first state F1 that indicates no occurrence of the interruption process (Step A5), and then returns control to the patrol controller 126. Then, the patrol controller 126 executes a first patrol process which is applied to stripe groups assigned with first priorities (second stripe groups) (Step A6). The details of the first patrol process will be described later.

The patrol controller 126 advances to Step A7 after having finished executing the first patrol process (Step A6). It should be noted that, if variable CNT_P1 is 0 as in the case of immediately after initialization of the management table 129, the patrol controller 126 advances to Step A7 without substantially executing the first patrol process. Moreover, if there are one or more stripe groups which are assigned with the first priorities (third stripe groups) after the first patrol process has started (Step A6), the patrol controller 126 returns to Step A2.

In Step A7, the patrol controller 126 sets pointer PTR2 to point to a leading stripe group included in the stripe groups which are assigned with second priorities (fourth stripe groups). It should be noted that, when there exists no stripe group assigned with the second priority, as in the case of immediately after initialization of the management table 129, an invalid value is set to pointer PTR2, for example.

Subsequently, the patrol controller 126 passes control to the wait controller 127. In response, the wait controller 127 sets flag F[L] to first state F1 (Step A8), and then returns control to the patrol controller 126. Then, the patrol controller 126 executes a second patrol process which is applied to stripe groups assigned with the second priorities (second stripe groups) (Step A9). The details of the second patrol process will be described later.

The patrol controller 126 advances to Step A10 after having finished executing the second patrol process (Step A9). It should be noted that, when there exists no stripe group assigned with the second priority, as in the case of immediately after initialization of the management table 129, the patrol controller 126 advances to Step A10 without substantially executing the second patrol process. Moreover, if one or more stripe groups assigned with the first priorities newly appear during the second patrol process, the patrol controller 126 compulsorily finishes the second patrol process, and returns to Step A2.

In Step A10, the patrol controller 126 sets pointer PTR3 to point to a leading stripe group included in the stripe groups which are assigned with third priorities (fifth stripe groups). It should be noted that, when there exists no stripe group assigned with the third priority, as in the case of immediately after initialization of the management table 129, an invalid value is set to pointer PTR3, for example.

In the following explanation, a stripe group that is pointed by pointer PTRu (u=1, 2, 3) will be expressed as stripe group SG_PTRu. Moreover, stripe group SG_PTRu has a last write time, a last read time, a patrol status, a last patrol time, a patrol priority, and a write count, which are respectively expressed as last write time LWT_PTRu, last read time LRT_PTRu, patrol status PS_PTRu, last patrol time LPT_PTRu, patrol priority PP_PTRu, and write count WC_PTRu. Moreover, an entry of the management table 129, which is associated with stripe group SG_PTRu, is expressed as entry E_PTRu.

Subsequently, the patrol controller 126 passes control to the wait controller 127. In response, the wait controller 127 sets flag F[L] to first state F1 (Step A11), and then returns control to the patrol controller 126.

Then, the patrol controller 126 sets S1, as a patrol status PS, in each of the patrol status fields of the management table 129, which are associated with the stripe groups assigned with the third priorities, in order to indicate that patrolling is not yet executed (Step A12). As a result, all the stripe groups presently assigned with the third priorities are processed as patrol targets.

Subsequently, the patrol controller 126 executes a third patrol process which is applied to stripe groups assigned with third priorities (Step A13). The details of the third patrol process will be described later. If one or more stripe groups assigned with the first priorities newly appear during the third patrol process, the patrol controller 126 returns to Step A2.

As apparent from the above-mentioned patrol process which follows the flowchart of FIG. 5, if there are one or more stripe groups which each have a state of the absence of priority as indicated by the symbol SKIP (sixth stripe groups), the patrol controller 126 excludes the sixth stripe groups from the patrol targets in the patrol process. The sixth stripe groups are stripe groups which have never been accessed after initialization of the management table 129. Accordingly, in the embodiment, suppression of patrolling of the sixth stripe groups makes it possible to efficiently patrol the other stripe groups (i.e., stripe groups each assigned with one of the first to the third priorities).

Now, the first patrol process (Step A6 of FIG. 5) will be explained in detail with reference to FIG. 6. FIG. 6 is a flowchart illustrating an exemplary procedure of the first patrol process. The patrol controller 126 first passes control to the wait controller 127. In response, the wait controller 127 sets flag F[T] to first state F1 that indicates no occurrence of the interruption process (Step A21), and then returns control to the patrol controller 126.

Then, the patrol controller 126 determines whether count CNT_P1 is larger than zero, i.e., whether there are one or more stripe groups which are to be patrolled at top priority (Step A22). If count CNT_P1 is larger than zero (Yes in Step A22), the patrol controller 126 refers to the management table 129, and determines whether patrol status PS_PTR1 of stripe group SG_PTR1 pointed by pointer PTR1 is S2 (Step A23).

If PS_PTR1 is S2 (Yes in Step A23), the patrol controller 126 determines that stripe group SG_PTR1 is already assigned with the first priority according to a write operation having been executed before the start of the present first patrol process and is a patrol target in the present first patrol process. In this case, the patrol controller 126 decrements count CNT_P1 by 1 (Step A24), and then patrols stripe group SG_PTR1 as follows.

The patrol controller 126 first executes read operation, thereby reading data from stripe group SG_PTR1 (Step A25), and then determines whether data is normally read (Step A26). If there occurs an error that data cannot be normally read from stripe group SG_PTR1 (No in Step A26), the patrol controller 126 determines that the error is a medium error, and executes an error recovery process as follows (Step A27).

Let us suppose here that stripe group SG_PTR1 has three data blocks, from two of which data can be normally read, but from the remaining one of which data cannot be normally read. The former two blocks are called normal data blocks, and the latter one block is called a failed data block. In this case, the patrol controller 126 executes a well-known rebuilding process based on data having been read from the two normal data blocks in stripe group SG_PTR1 and redundant data (parity data) having been read from the redundant block in stripe group SG_PTR1. As a result, the patrol controller 126 restores data of the failed data block.

An HDD which includes the failed data block will be hereinafter expressed as HDD 111_i. In this case, the patrol controller 126 allocates, to stripe group SG_PTR1, a block which is in HDD 111_i and is not used by any of the stripe groups SG1 through SGn (i.e., an empty block), in place of the failed data block. Thus, the patrol controller 126 finishes an error recovery process (Step A27), and advances to Step A28. In contrast, if data can be normally read from stripe group SG_PTR1 (Yes in Step A26), the patrol controller 126 skips Step A27, and advances to Step A28.

In Step A28, the patrol controller 126 updates the content of entry E_PTR1 of the management table 129, which is associated with stripe group SG_PTR1. That is, the patrol controller 126 updates, to S3 and 3 (the third priority), patrol status PS_PTR1 and patrol priority PP_PTR1 indicated by entry E_PTR1 of the management table 129, respectively. Moreover, the patrol controller 126 updates information which is included in entry E_PTR1 and indicates last patrol time LPT_PTR1 so that current time may be indicated.

When the patrol controller 126 has finished executing Step A28, it advances to Step A29. On the other hand, if PS_PTR1 is not S2 (No in Step A23), the patrol controller 126 determines that the first priority is set as patrol priority PP_PTR1 of stripe group SG_PTR1 according to the write operation executed after the start of the present first patrol process. Consequently, the patrol controller 126 determines that stripe group SG_PTR1 is not a patrol target in the present first patrol process, skips Steps A24 to A28, and advances to Step A29.

In Step A29, the patrol controller 126 executes a wait operation and keeps waiting till the set waiting time Tw has elapsed. That is, the patrol controller 126 interrupts the first patrol process for the waiting time Tw. When the waiting time Tw has elapsed, the patrol controller 126 passes control to the wait controller 127.

Then, the wait controller 127 executes a waiting time resetting process for resetting the waiting time Tw (Step A30). That is, in the waiting time resetting process, the wait controller 127 adjusts the waiting time Tw according to the circumstances of the access operation (the interruption process) which the I/O controller 128 executes based on the access request from the host 20. The details of the waiting time resetting process will be described later.

Subsequently, the wait controller 127 sets a state of present flag F[T] to flag F[L] (Step A31). Namely, the wait controller 127 considers that the wait operation (Step A29) executed this time is the last wait operation, and carries over the state of present flag F[T] to flag F[L] as a state indicative of whether the interruption process has occurred during the last wait operation. And the wait controller 127 returns control to the patrol controller 126.

Then, the patrol controller 126 advances pointer PTR1 so that pointer PTR1 points to a next stripe group assigned with the first priority (Step A32). The next stripe group assigned with the first priority is a stripe group which is next smaller in stripe group number than stripe group SG_PTR1 to which pointer PTR1 presently points among the stripe groups assigned with the first priorities. And the patrol controller 126 returns to Step A21, and executes again the process which begins from Step A21.

Now, let us suppose a case where count CNT_P1 is not more than 0 (No in Step A22). This state occurs when count CNT_P1 is set to 0 as in a case of immediately after initialization of the management table 129, or when count CNT_P1 reaches 0 after the process which begins from Step A21 is repeated to cause count CNT_P1 to be repeatedly decremented (Step A24). In such a case, the patrol controller 126 refers to the management table 129, and determines whether there exists any stripe group assigned with the first priority (Step A33).

If there is any stripe group assigned with the first priority (Yes in Step A33), the patrol controller 126 determines that one or more stripe groups assigned with the first priorities have been newly appeared during the first patrol process. In this case, the patrol controller 126 returns from the first patrol process (Step A6 of FIG. 5), which follows the flowchart of FIG. 6, to Step A2 of FIG. 5, for patrolling the stripe groups which are assigned with first priorities and have appeared during the first patrol process.

On the other hand, if there is no stripe group assigned with the first priority (No in Step A33), the patrol controller 126 finishes the first patrol process which follows the flowchart of FIG. 6 (Step A6 of FIG. 5), and advances to Step A7 (FIG. 5) as mentioned above for patrolling stripe groups assigned with the second priorities.

In the above explanation, Steps A2 through A5 have been executed first, and then the first patrol process (Step A6) is executed. However, it is possible that Steps A2 through A5 may be included in the first patrol process and may be executed at the beginning of the first patrol process. That is, in the first patrol process, Steps A2 through A5 may be executed first and then the process which begins from Step A21 may be executed.

Now, the second patrol process (Step A9 of FIG. 5) will be explained in detail with reference to FIG. 7. FIG. 7 is a flowchart illustrating an exemplary procedure of the second patrol process. The patrol controller 126 first passes control to the wait controller 127. In response, the wait controller 127 sets, as it does at the beginning of the first patrol process, flag F[T] to first state F1 (Step A41), and then returns control to the patrol controller 126.

Then, the patrol controller 126 refers to entry E_PTR2 of the management table 129 based on pointer PTR2, and determines whether pointer PTR2 points to a stripe group assigned with the second priority (Step A42). If pointer PTR2 points to a stripe group assigned with the second priority (Yes in Step A42), the patrol controller 126 determines whether patrol status PS_PTR2 of stripe group SG_PTR2 pointed by pointer PTR2 is S1 (Step A43).

If PS_PTR2 is S1 (Yes in Step A43), the patrol controller 126 determines that stripe group SG_PTR2 is not yet patrolled and is a patrol target in the second patrol process. In this case, the patrol controller 126 executes patrolling of stripe group SG_PTR2 in the same way as patrolling of stripe group SG_PTR1 in the first patrol process.

Namely, the patrol controller 126 executes read operation, thereby reading data from stripe group SG_PTR2 (Step A44), and then determines whether data is normally read (Step A45). If data cannot be normally read (No in Step A45), the patrol controller 126 executes an error recovery process (Step A46), and then advances to Step 47. In contrast, if data can be normally read (Yes in Step A45), the patrol controller 126 skips Step A46, and advances to Step A47.

In Step A47, the patrol controller 126 updates the content of entry E_PTR2 of the management table 129, which is associated with stripe group SG_PTR2. That is, the patrol controller 126 updates, to S3 and 3 (the third priority), patrol status PS_PTR2 and patrol priority PP_PTR2 indicated by entry E_PTR2 of the management table 129, respectively. Moreover, the patrol controller 126 updates information which is included in entry E_PTR2 and indicates last patrol time LPT_PTR2 so that current time may be indicated.

When the patrol controller 126 has finished executing Step A47, it advances to Step A48. On the other hand, if PS_PTR2 is not S1 (No in Step A43), the patrol controller 126 determines that stripe group SG_PTR2 is not a patrol target in the present second patrol process. In this case, the patrol controller 126 skips Steps A44 to A47, and advances to Step A48.

In Step A48, the patrol controller 126 executes a wait operation and keeps waiting till the set waiting time Tw has elapsed. That is, the patrol controller 126 interrupts the second patrol process for the waiting time Tw. When the waiting time Tw has elapsed, the patrol controller 126 passes control to the wait controller 127.

Then, the wait controller 127 executes a waiting time resetting process (Step A49). The waiting time resetting process will be described later in detail. Subsequently, the wait controller 127 sets the state of present flag F[T] to flag F[L] (Step A50). Namely, the wait controller 127 carries over the state of present flag F[T] to flag F[L] as a state indicative of whether the interruption process has occurred during the last wait operation. Then, the wait controller 127 returns control to the patrol controller 126.

Subsequently, the patrol controller 126 refers to the management table 129, and determines whether there is any stripe group assigned with the first priority (Step A51). If there is no stripe group assigned with the first priority (No in Step A51), the patrol controller 126 determines that there has not been appeared any stripe group assigned with the first priority during the second patrol process. In this case, the patrol controller 126 advances to Step A52.

In Step A52, the patrol controller 126 advances pointer PTR2 to point to a next stripe group assigned with the second priority. However, when there is no stripe group assigned with the second priority, the patrol controller 126 sets an invalid value to pointer PTR2. After execution of Step A52, the patrol controller 126 returns to Step A41, and executes again the process which begins from Step A41.

In contrast, if there is any stripe group assigned with the first priority (Yes in Step A51), the patrol controller 126 determines that one or more stripe groups assigned with the first priorities have been newly appeared during the second patrol process. In this case, in order to preferentially patrol stripe groups assigned with the first priorities, the patrol controller 126 forcefully terminates the second patrol process even if the second patrol process is in the progress. Then, the patrol controller 126 returns to Step A2 of FIG. 5.

Let us suppose here that, unlike the above example, pointer PTR2 does not point to a stripe group assigned with the second priority (No in Step A42). Namely, let us suppose that an invalid value is set to pointer PTR2. This situation may occur when, at the beginning of the second patrol process, there is no stripe group assigned with the second priority, as in the case of immediately after initialization of the management table 129, or when patrolling of stripe groups assigned with the second priorities has been completed before appearance of stripe groups assigned with the first priorities. In this case, the patrol controller 126 finishes the second patrol process following the flowchart of FIG. 7 (Step A9 of FIG. 5), and advances to Step A10 (FIG. 5) as described before.

In the above explanation, Steps A7 and A8 have been executed first, and then the second patrol process (Step A9) is executed. However, it is possible that Steps A7 and A8 may be included in the second patrol process and may be executed at the beginning of the second patrol process. That is, in the second patrol process, Steps A7 and A8 may be executed first and then the process which begins from Step A41 may be executed.

Now, the third patrol process (Step A10 of FIG. 5) will be explained in detail with reference to FIG. 8. FIG. 8 is a flowchart illustrating an exemplary procedure of the third patrol process. The patrol controller 126 first passes control to the wait controller 127. In response, the wait controller 127 sets, as it does at the beginning of the first patrol process, flag F[T] to first state F1 (Step A61), and then returns control to the patrol controller 126.

Then, the patrol controller 126 refers to entry E_PTR3 of the management table 129 based on pointer PTR3, and determines whether pointer PTR3 points to a stripe group assigned with the third priority (Step A62). If pointer PTR3 points to a stripe group assigned with the third priority (Yes in Step A62), the patrol controller 126 determines whether patrol status PS_PTR3 of stripe group SG_PTR3 pointed by pointer PTR3 is S1 (Step A63).

If PS_PTR3 is S1 (Yes in Step A63), the patrol controller 126 determines that stripe group SG_PTR3 is not yet patrolled and is a patrol target in the third patrol process. In this case, the patrol controller 126 executes patrolling of stripe group SG_PTR3 in the same way as patrolling of stripe group SG_PTR1 in the first patrol process.

Namely, the patrol controller 126 executes read operation, thereby reading data from stripe group SG_PTR3 (Step A64), and then determines whether data is normally read (Step A65). If data cannot be normally read (No in Step A65), the patrol controller 126 executes an error recovery process (Step A66), and then advances to Step 67. In contrast, if data can be normally read (Yes in Step A65), the patrol controller 126 skips Step A66, and advances to Step A67.

In Step A67, the patrol controller 126 updates the content of entry E_PTR3 of the management table 129, which is associated with stripe group SG_PTR3. That is, the patrol controller 126 updates, to S3, patrol status PS_PTR3 indicated by entry E_PTR3 of the management table 129. Moreover, the patrol controller 126 updates information which is included in entry E_PTR3 and indicates last patrol time LPT_PTR3 so that current time may be indicated. Thus, the patrol controller 126 completes Step A67. Accordingly, patrol priority PP_PTR3 of stripe group SG_PTR3 is kept to be in a third priority.

When the patrol controller 126 has finished executing Step A67, it advances to Step A68. On the other hand, if PS_PTR3 is not S1 (No in Step A63), the patrol controller 126 determines that stripe group SG_PTR3 is not a patrol target in the present third patrol process. In this case, the patrol controller 126 skips Steps A64 to A67, and advances to Step A68.

Let us suppose here that, unlike the above example, pointer PTR3 does not point to a stripe group assigned with the third priority (No in Step A62). Namely, let us suppose that an invalid value is set to pointer PTR3. This situation may occur when, at the beginning of the third patrol process, there is no stripe group assigned with the third priority, as in the case of immediately after initialization of the management table 129, or when patrolling of stripe groups assigned with the third priorities has been completed before appearance of stripe groups assigned with the first priorities. In this case, the patrol controller 126 also advances to Step A68.

In Step A68, the patrol controller 126 executes a wait operation and keeps waiting till the set waiting time Tw has elapsed. That is, the patrol controller 126 interrupts the third patrol process for the waiting time Tw. When the waiting time Tw has elapsed, the patrol controller 126 passes control to the wait controller 127.

Then, the wait controller 127 executes a waiting time resetting process (Step A69). The waiting time resetting process will be described later in detail. Subsequently, the wait controller 127 sets the state of present flag F[T] to flag F[L] (Step A70). Namely, the wait controller 127 carries over the state of present flag F[T] to flag F[L]. Then, the wait controller 127 returns control to the patrol controller 126.

Subsequently, the patrol controller 126 refers to the management table 129, and determines whether there is any stripe group assigned with the first priority (Step A71). If there is no stripe group assigned with the first priority (No in Step A71), the patrol controller 126 determines that there has not been appeared any stripe group assigned with the first priority during the third patrol process. In this case, the patrol controller 126 advances to Step A72.

In Step A72, the patrol controller 126 advances pointer PTR3 to point to a next stripe group assigned with the third priority. However, when there is no stripe group assigned with the third priority, the patrol controller 126 sets an invalid value to pointer PTR3. After execution of Step A72, the patrol controller 126 returns to Step A61, and executes again the process which begins from Step A61.

In contrast, if there is any stripe group assigned with the first priority (Yes in Step A71), the patrol controller 126 determines that one or more stripe groups assigned with the first priorities have been newly appeared during the third patrol process. In this case, in order to preferentially patrol stripe groups assigned with the first priorities, the patrol controller 126 forcefully terminates the third patrol process even if the third patrol process is in the progress. Then, the patrol controller 126 returns to Step A2 of FIG. 5.

As mentioned above, the patrol controller 126 in the embodiment sets priorities (specifically, first priorities) higher than properties assigned to any other stripe groups, as patrol priorities of stripe groups which have been subjected to write access. This makes it possible for the patrol controller 126 to patrol, in preference to any other stripe groups, stripe groups which have been subjected to write access. Accordingly, a medium error resulting from write access, such as a weak write, can be detected at an early stage, and occurrence of a multiple failure in a RAID array can be prevented.

In addition, after patrolling all the stripe groups which have been subjected to write access, the patrol controller 126 reduces the patrol priority of each of the patrolled stripe groups (specifically to a third priority lower than a patrol priority of a stripe group which has been subjected to read access) until the patrolled stripe groups are subjected to write access again. This makes it possible to surely prevent any stripe group, which has been subjected to write access and has been already patrolled, from being patrolled more preferentially than other stripe groups to be patrolled (for example, those stripe groups that have been subjected to read access).

Now, the waiting time resetting process (Step A30 of FIG. 6, Step A49 of FIG. 7, and Step A69 of FIG. 8) will be explained in detail with reference to FIG. 9. FIG. 9 is a flowchart illustrating an exemplary procedure of the waiting time resetting process. In the embodiment, Step A30 of FIG. 6, Step A49 of FIG. 7, and Step A69 of FIG. 8 are the same in procedure executed in the waiting time resetting process.

The wait controller 127 first determines whether each of present flags F[L] and F[T] is set to second state F2 (Step A81). In the embodiment, flag F[L] is set to first state F1 just before each of the first to third patrol processes (Steps A5, A8 and A11 of FIG. 5). On the other hand, flag F[T] is set to first state F1 at the beginning of a loop included in each of the first to third patrol processes (Step A21 of FIG. 6, Step A41 of FIG. 7, and Step A61 of FIG. 8). Moreover, in the loop of each of the first to third patrol processes, the state of flag F[T] at the time when each of the first to third patrol processes is interrupted (Step A29 of FIG. 6, Step A48 of FIG. 7, and Step A68 of FIG. 8) and when the waiting time resetting process is executed (Step A30 of FIG. 6, Step A49 of FIG. 7, and Step A69 of FIG. 8) is carried over to flag F[L] (Step A31 of FIG. 6, Step A50 of FIG. 7, and Step A70 of FIG. 8). When the interruption process is executed while the patrol process is suspended, flag F[T] is set to second state F2 at the beginning of the interruption process as will be described later (Step A91 of FIG. 10).

Accordingly, if at least one interruption process occurs during each of two successive patrol processing interruptions (wait operations), flags F[L] and F[T] will be each set to second state F2. On the other hand, if no interruption process does occur during each of the two successive wait operations, flags F[L] and F[T] will be each set to first state F1.

Consequently, the wait controller 127 determines that the frequency of interruption processes is high (in a first level) when flags F[L] and F[T] are each set to second state F2 (Yes in Step A81). In this case, the wait controller 127 increases the waiting time Tw in order to sufficiently give priority to the interruption process (specifically, an access operation included in the interruption process) over the patrol process (Step A82). That is, the wait controller 127 increases the waiting time Tw by a certain period of time ΔT, for instance.

In contrast, when at least one of flags F[L] and F[T] is set to first state F1 (No in Step A81), the wait controller 127 determines whether flags F[L] and F[T] are each set to first state F1 (Step A83). When flags F[L] and F[T] are each set to first state F1 (Yes in Step A83), the wait controller 127 determines that the frequency of interruption processes is low (in a second level lower than the first level). In this case, the wait controller 127 decreases the waiting time Tw in order to reduce the degree of preference for the interruption process to the patrol process (Step A84). That is, the wait controller 127 decreases the waiting time Tw by the certain period of time ΔT, for instance.

In contrast, when one of flags F[L] and F[T] is set to first state F1 and the other is set to second state F2 (No in Step A83), the wait controller 127 determines that the frequency of interruption processes is middle (in a third level which is between the first level and the second level). In this case, the wait controller 127 maintains the waiting time Tw to a current value (Step A85).

In the embodiment, the wait controller 127 increases or decreases the waiting time Tw by the certain period of time ΔT in order to adjust the waiting time Tw. However, it is possible that the wait controller 127 may increase or decrease the waiting time Tw by a certain rate.

Now, the interruption process in the embodiment will be explained with reference to FIG. 10. FIG. 10 is a flowchart illustrating an exemplary procedure of the interruption process. In the embodiment, access requests from the host 20 are set in an access request list in the order in which they are received by the HIF controller 121, for example. The access request list has a queue structure, for example, and is stored in the memory 123. In the embodiment, the access requests set in the access request list are executed during the interruption process. When at least one access request is set in the access request list, the I/O controller 128 executes the interruption process during time Tw or while the wait controller 127 is in a waiting state of waiting for the process concerning patrolling (or in a suspended state). A period of being in the waiting state of waiting for the process concerning patrolling indicates a period while the wait controller 127 is in its waiting operation (Step A29 of FIG. 6, Step A48 of FIG. 7, and Step A68 of FIG. 9).

In the interruption process, the I/O controller 128 first passes control to the wait controller 127. In response, the wait controller 127 sets interruption flag F[T] to second state F2 (Step A91), and returns control to the I/O controller 128. Then, the I/O controller 128 extracts an access request which is to be executed next (for example, an access request which is the oldest at the very moment) from the access request list, and determines whether the extracted access request is a read request or not (namely, a write request) (Step A92).

If the extracted access request is the read request (Yes in Step A92), the I/O controller 128 executes the read request (Step A93). Let us suppose here that, because of this operation, data is read from data blocks included in stripe group RSG in RAID array 111. After having finished executing the read request, the I/O controller 128 passes control to the patrol controller 126.

In response, the patrol controller 126 updates, as follows, the content of entry E_RSG of the management table 129, which is associated with stripe group RSG (Step A94). The patrol controller 126 updates (sets), to S1 and 2 (a second priority), patrol status PS_RSG and patrol priority PP_RSG indicated by entry E_RSG of the management table 129, respectively. Moreover, the patrol controller 126 updates information which is included in entry E_RSG of the management table 129 and indicates last read time LRT_RSG so that current time may be indicated.

In contrast, if the extracted access request is the write request (No in Step A92), the I/O controller 128 executes the write request (Step A95). Let us suppose here that, because of this operation, data is written to data blocks included in stripe group WSG in RAID array 111, for instance. After having finished executing the write request, the I/O controller 128 passes control to the patrol controller 126.

In response, the patrol controller 126 updates, as follows, the content of entry E_WSG of the management table 129, which is associated with stripe group WSG (Step A96). The patrol controller 126 updates (sets), to S1 and 1 (a first priority), patrol status PS_WSG and patrol priority PP_WSG indicated by entry E_WSG of the management table 129, respectively. Moreover, the patrol controller 126 updates information which is included in entry E_WSG and indicates last write time LWT_WSG so that current time may be indicated. The patrol controller 126 furthermore increments by 1 write count WC_WSG in entry E_WSG.

When the management table 129 is updated by the patrol controller 126 (Step A94 or A96), the I/O controller 128 finishes the interruption process which follows the flowchart of FIG. 10. Let us suppose here that the waiting time Tw has not elapsed yet even though the interruption process has been completed, and that the patrol controller 126 is therefore still in the waiting state of waiting for the process concerning patrolling. Under this supposition, if there still remains in the access request list any access request that is not yet executed, the I/O controller 128 starts the interruption process again. Moreover, if the process concerning patrolling is resumed because the waiting time Tw has elapsed even though there still remains in the access request list any access request that is not yet executed, the I/O controller 128 waits for the process concerning patrolling to be next interrupted.

<First Modification>

Now, a first modification of the embodiment will be explained with reference to FIG. 11 and FIG. 12. FIG. 11 illustrates an exemplary RAID configuration of a RAID storage device 110. The RAID storage device 110 is used in the first modification in place of the RAID storage device 11 illustrated in FIG. 1. FIG. 12 illustrates a data structure example of a management table 1291. The management table 1291 is used in the first modification in place of the management table 129 illustrated in FIG. 3. More specifically, FIG. 12 illustrates a data structure example of the management table 1291 at the time when the initialization corresponding to Step A1 of FIG. 5 has been completed.

The RAID storage device 110 illustrated in FIG. 11 not only includes RAID array 111 illustrated in FIG. 1 and FIG. 2, but also includes RAID arrays 112 and 113 in addition, for example. That is, the RAID storage device 110 includes three RAID arrays 111 to 113.

In the first modification, a structure which a RAID storage system excluding the RAID storage device 110 has and a functional structure which a storage controller 12 in the RAID storage system has are respectively the same as that of FIG. 1 and that of FIG. 3. Accordingly, if necessary, please refer to FIG. 1 with imaginarily replacing the RAID storage device 11 and the RAID array 111 with the RAID storage device 110 and the RAID arrays 111 to 113, respectively. Furthermore, please refer to FIG. 3 with imaginarily replacing the management table 129 with the management table 1291.

The RAID arrays 111 to 113 have their respective RAID array numbers RAN's as their identifiers for identifying the RAID arrays 111 to 113. The RAID arrays 111 to 113 respectively have 1 to 3, for example, as their respective RAID array numbers. Let us suppose that the RAID arrays 111 to 113 in the first modification are different in importance for the user using the RAID storage device 110. Let us suppose here that the RAID array 111 is the highest in importance and that the RAID array 112 and the RAID array 113 become lower in importance in this order.

As illustrated in FIG. 11, the RAID array 112 includes HDD's 112_1 to 112_4, and the RAID array 113 includes HDD's 113_1 to 113_4. In the first modification, each of the RAID arrays 111 to 113 includes a set of four HDD's. It should be noted that each of the RAID arrays 111 to 113 includes at least two (plural) HDD's, but that the RAID arrays 111 to 113 do not necessarily have the same number of HDD's.

The RAID array 111 includes n stripe groups SG1 through SGn which respectively have stripe group numbers (SGN) 1 through n as mentioned above. The RAID array 112 includes k-n stripe groups SGn+1 through SGk which respectively have stripe group numbers n+1 through k (k>n+1). The RAID array 113 includes m-k stripe groups SGk+1 through SGm which respectively have stripe group numbers k+1 through m (m>k+1).

Let us suppose that RAID 5 (RAID level 5) is applied to each of the RAID arrays 112 and 113 in the same way as the RAID array 111. However, if respective stripe group SGj (j=1, 2, . . . , m) in the RAID arrays 111 to 113 includes at least one redundant block, the RAID arrays 111 to 113 may have a RAID configuration other than RAID 5, such as RAID 1, RAID 4, or RAID 6.

The management table 1291 illustrated in FIG. 12 has entries associated with respective stripe groups SG1 through SGm in the RAID storage device 110 (RAID arrays 111 to 113), for example. Similarly to each of the entries of the management table 129 illustrated in FIG. 4, each of the entries of the management table 1291 includes: a stripe group number field, a last write time field, a last read time field, a patrol status field, a last patrol time field, a patrol priority field, and a write count field. Each of the entries of the management table 1291 illustrated in FIG. 12 further includes, in addition to these fields, a RAID array number field and a RAID array priority field. Hereafter, the RAID array number field and the RAID array priority field included in an entry associated with stripe group SGj will be explained.

The RAID array number field is used for holding RAID array number RAN assigned to a RAID array including stripe group SGj. The RAID array priority field is used for holding information indicative of priority (hereinafter referred to as a RAID array priority) RAP which is assigned to the RAID array including stripe group SGj and concerns execution of patrolling of the RAID array.

The RAID array number field and the RAID array priority field are respectively set with RAID array number RAN and RAID array priority RAP through an initialization process corresponding to Step A1 of FIG. 5. FIG. 12 illustrates a data structure example of the management table 1291 at the time when the initialization process has been completed.

In the first modification, RAID array priorities RAP's of the RAID arrays 111 to 113 are specified by the host 20 in accordance with instructions given by the user based on the difference in importance among the RAID arrays 111 to 113. Let us suppose here that RAID array priorities RAP's of the RAID arrays 111, 112 and 113 are set to 1, 3, and 2, respectively, as illustrated in FIG. 12, through the above-mentioned initialization process. RAP=1 indicates the highest in RAID array priority, and RAP=2 and RAP=3 become lower in RAID array priority in this order.

Now, a patrol process in the first modification will be explained. The procedural outline of the patrol process in the first modification is almost the same as that of the embodiment. The patrol controller 126 first executes an initialization process which corresponds to Step A1 in FIG. 5. Subsequently, the wait controller 127 patrols stripe groups (seventh stripe groups) which are included in the RAID storage device 110 (RAID arrays 111 to 113) and are each assigned with the first priority, in accordance with RAID array priorities assigned to the respective RAID arrays 111 to 113 as follows.

First of all, by executing a first patrol process which corresponds to Step A6 in FIG. 5, the patrol controller 126 patrols stripe groups which are included in the seventh stripe groups and are included in the RAID array 111 assigned with a highest RAID array priority (namely, the RAID array 111 which has the highest RAID array priority). It should be noted that prior to the first patrol process those processes that correspond to Steps A2 to A5 in FIG. 5 are also performed.

Subsequently, by still executing the first patrol process which corresponds to Step A6 in FIG. 5, the patrol controller 126 patrols stripe groups which are included in the seventh stripe groups and are included in the RAID array 113 assigned with a second highest RAID array priority. Then, by still executing the first patrol process which corresponds to Step A6 in FIG. 5, the patrol controller 126 furthermore patrols stripe groups which are included in the seventh stripe groups and are included in the RAID array 112 assigned with a third highest (namely, the lowest) RAID array priority. In this way, in the patrolling of the seventh stripe groups, the patrol controller 126 patrols stripe groups in a RAID array assigned with a higher RAID array priority, preferentially earlier than the remaining other stripe groups in the seventh stripe groups.

Let us suppose here that, while patrolling the seventh stripe groups, there newly appears in the RAID arrays 111 to 113 stripe groups (eighth stripe groups) each of which is assigned with the first priority. In this case, similarly to the embodiment, the patrol controller 126 patrols the eighth stripe groups in the RAID arrays 111 to 113, after having completed the patrolling of the seventh stripe groups. However, the patrol controller 126 patrols the eighth stripe groups in the RAID arrays 111 to 113 in accordance with difference in RAID array priorities among the RAID arrays 111 to 113. The seventh stripe groups and the eighth stripe groups correspond to the second stripe groups and the third stripe groups in the embodiment, respectively.

Subsequently, the patrol controller 126 patrols stripe groups (ninth stripe groups) which are included in the RAID arrays 111 to 113 and are each assigned with the second priority, in order of RAID array priorities assigned to the respective RAID arrays 111 to 113. The ninth stripe groups correspond to the fourth stripe groups in the embodiment. if there newly appears in the RAID arrays 111 to 113 stripe groups (tenth stripe groups) which are each assigned with the first priority while the ninth stripe groups are patrolled, the patrol controller 126 patrols the tenth stripe groups in the RAID arrays 111 to 113 in order of RAID array priorities assigned to the respective RAID arrays 111 to 113 even if the patrolling of the ninth stripe groups is not yet completed.

Subsequently, the patrol controller 126 patrols stripe groups (eleventh stripe groups) which are included in the RAID arrays 111 to 113 and are each assigned with the third priority, in order of RAID array priorities assigned to the RAID arrays 111 to 113. The eleventh stripe groups correspond to the fifth stripe groups in the embodiment. if there newly appears in the RAID arrays 111 to 113 stripe groups (twelfth stripe groups) which are each assigned with the first priority while the eleventh stripe groups are patrolled, the patrol controller 126 patrols the twelfth stripe groups in the RAID arrays 111 to 113 in order of RAID array priorities assigned to the respective RAID arrays 111 to 113 even if the patrolling of the eleventh stripe groups is not yet completed.

In the first modification, if the RAID storage device 110 includes a plurality of RAID arrays, each of the RAID arrays is assigned with a priority concerning execution of patrolling (more specifically, a RAID array priority RAP as a preferential order among the RAID arrays). In this way, in the first modification, not only respective stripe group in each RAID array is assigned with a priority concerning execution of patrolling (patrol priority PP) but also each RAID array is assigned with a priority concerning execution of patrolling (RAID array priority RAP). Accordingly, the first modification makes it possible to preferentially patrol stripe groups in a RAID array assigned with a higher RAID array priority RAP (for example, a more important RAID array) even if the stripe group is the same in assigned priority as the other stripe groups. Accordingly, the first modification makes it possible to more efficiently patrol RAID arrays.

<Second Modification>

Now, a second modification of the embodiment will be explained with reference to FIG. 11 and FIG. 13. Let us suppose that the second modification uses the RAID storage device 110 illustrated in FIG. 11 in place of the RAID storage device 11 illustrated in FIG. 1 similarly to the first modification. FIG. 13 illustrates a data structure example of a management table 1292 used in place of the management table 1291 illustrated in FIG. 12. Similarly to the management table 1291 illustrated in FIG. 12, the management table 1292 has entries associated with respective stripe groups SG1 to SGm in the RAID storage device 110 (RAID arrays 111 to 113). The point that the management table 1292 is different from the management table 1291 is that each of the entries of the management table 1292 further includes an error count field.

Consequently, the error count field in an entry of the management table 1292, which is associated with stripe group SGj (j=1, 2, . . . , m), will be explained. The error count field is used for holding, as error count EC, the number of errors detected by patrolling stripe group SGj. The error count field is set to 0 as its initial value through an initialization process corresponding to Step A1 of FIG. 5.

In the second modification, let us suppose that initial values of RAID array priorities RAP's of the RAID arrays 111, 112 and 113 are 1, 3, and 2, respectively, similarly to the first modification. The point that the second modification is different from the first modification is that RAID array priority RAP of any one of the RAID arrays 111 to 113 is changed based on the total number of errors detected by patrolling a corresponding one of the RAID arrays 111 to 113.

In the second modification, immediately after the initialization process corresponding to Step A1 of FIG. 5, the patrol controller 126 patrols stripe groups which are included in any of the RAID arrays 111 to 113 and are assigned with one of the first through the third priority (patrol priority), similarly to the first modification in order of patrol priorities assigned to the respective stripe groups and in order of RAID array priorities initially assigned to the respective RAID arrays 111 to 113. Namely, the patrol controller 126 patrols stripe groups which are included in the respective RAID arrays 111 to 113 and are the same in assigned priority, in order of stripe groups in the RAID array 111, stripe groups in the RAID array 113, and stripe groups in the RAID array 112.

When the stripe groups which are included in the respective RAID arrays 111 to 113 and are assigned with any one of the first through third priorities have been once patrolled round, the patrol controller 126 totals up, for every RAID array, values (error counts EC's) set in the respective error count fields of the entries of the management table 1292, which are associated with the respective stripe groups included in any one of the RAID arrays 111 to 113. Namely, the patrol controller 126 acquires a total error count of each of the RAID arrays 111 to 113 based on error counts (EC's) associated with the respective stripe groups that are included in any one of the RAID arrays 111 to 113.

Subsequently, the patrol controller 126 resets the RAID array priorities of the respective RAID arrays 111 to 113 in descending order of total error count. Namely, the patrol controller 126 sets a value (=1) indicative of a first place (namely, highest) RAID array priority RAP in each of RAID array priority fields of entries of the management table 1292 which are associated with all the stripe groups included in a RAID array which is the largest in total error count among the RAID arrays 111 to 113. Furthermore, the patrol controller 126 sets a value (=2) indicative of a second place (namely, second highest) RAID array priority RAP in each of RAID array priority fields of entries of the management table 1292 which are associated with all the stripe groups included in a RAID array which is the second largest in total error count among the RAID arrays 111 to 113. Moreover, the patrol controller 126 sets a value (=3) indicative of a third place (namely, lowest) RAID array priority RAP in each of RAID array priority fields of entries of the management table 1292 which are associated with all the stripe groups included in a RAID array which is the lowest in total error count among the RAID arrays 111 to 113.

In addition, the patrol controller 126 initializes each error count EC of all the entries of the management table 1292 to the value 0. It should be noted that an error count EC currently maintained at value 0 does not necessarily need to be initialized.

Subsequently, the patrol controller 126 resumes patrolling the RAID arrays 111 to 113. Namely, the patrol controller 126 patrols stripe groups which are included in any of the RAID arrays 111 to 113 and are assigned with one of the first through the third priority (patrol priority), in accordance with the patrol priorities assigned to the respective stripe groups and the RAID array priorities reset (renewedly assigned) to the respective RAID arrays 111 to 113.

As mentioned above, in the second modification, after all the stripe groups which are included in any of the RAID arrays 111 to 113 and are assigned with any of the first through third priorities are patrolled round for the first time, the patrol controller 126 resets the RAID array priorities assigned to the RAID arrays 111 to 113, according to the error detection circumstances obtained by patrolling the RAID arrays 111 to 113. This makes it possible for the patrol controller 126 to patrol stripe groups which are included in stripe groups that are the same in assigned priority and which are included in a RAID array higher than any other remaining RAID arrays in frequency of errors (medium errors) detected by patrolling, preferentially earlier than any other remaining stripe groups.

In the second modification, error count EC of stripe group SGj indicates a count of errors having been detected by patrolling stripe group SGj. That is, error count EC of stripe group SGj is incremented by 1 whenever an error is detected in stripe group SGj by patrolling stripe group SGj in any of the first through third patrol processes.

However, error count EC of stripe group SGj may indicate only a count of how many times an error is detected by patrolling stripe group SGj in the first patrol process alone. That is, error count EC of stripe group SGj may be incremented by 1 only when an error is detected by patrolling stripe group SGj in a state in which the first priority is assigned to stripe group SGj. In this case, it is sufficient if the patrol controller 126 totals up, for every RAID array, error counts EC's of stripe groups included in the respective RAID arrays 111 to 113, whenever the stripe groups which are included in the respective RAID arrays 111 to 113 and are assigned with the respective first priorities are patrolled round.

The above explained at least one embodiment makes it possible to detect medium errors in a RAID array at an early stage.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A redundant arrays of independent disks (RAID) storage system comprising:
   a RAID storage device including at least one RAID array, the at least one RAID array having a plurality of stripe groups, each of the stripe groups comprising a set of a plurality of blocks including a redundant block; and
   a storage controller which controls access to the at least one RAID array, wherein
   the storage controller comprises
      an input/output controller which executes one of a write access and a read access to a requested stripe group in the at least one RAID array according to an access request from a host device using the RAID storage device; and
      a patrol controller which patrols, using read operation, a stripe group having been subjected to the write access, earlier than other stripe groups, and, upon completion of patrolling the stripe group earlier than the other stripe groups, lowers a patrol priority indicative of order to be patrolled and assigned to the stripe group having been patrolled earlier than the other stripe groups, and
   the patrol controller
      assigns a first patrol priority to a first stripe group in accordance with the write access to the first stripe group, the first patrol priority being a patrol priority higher than any other patrol priorities,
      when patrolling the first stripe group in a state where the first stripe group is assigned with the first patrol priority, changes the first patrol priority assigned to the first stripe group to a third patrol priority in response to completion of the patrolling of the first stripe group, the third patrol priority being a patrol priority lower than the any other patrol priorities,
      assigns a second patrol priority to the first stripe group in accordance with the read access to the first stripe group, the second patrol priority being a patrol priority lower than the first patrol priority but higher than the third patrol priority, when patrolling the first stripe group in a state where the first stripe group is assigned with the second patrol priority, changes the second patrol priority assigned to the first stripe group to the third patrol priority in response to completion of the patrolling of the first stripe group, patrols a stripe group assigned with the second patrol priority when any stripe group assigned with the first patrol priority is absent and patrols a stripe group assigned with the third patrol priority when both any stripe group assigned with the first patrol priority and any stripe group assigned with the second patrol priority are absent.

2. The RAID storage system of claim 1, wherein when patrolling the first stripe group in a state in where the first stripe group is assigned with the third patrol priority, the patrol controller keeps the third patrol priority assigned to the first stripe group at the third patrol priority even after the patrolling of the first stripe group has been completed.

3. The RAID storage system of claim 1, wherein, when one or more third stripe groups are each newly assigned with the first patrol priority while one or more second stripe groups each assigned with the first patrol priority are being patrolled, the patrol controller patrols the one or more third stripe groups after the one or more second stripe groups have been patrolled but before one or more fourth stripe groups each assigned with the second patrol priority are patrolled.

4. The RAID storage system of claim 3, wherein the patrol controller manages, using management information, a patrol priority assigned to each of the stripe groups and a patrol status indicative of a status concerning patrolling of each of the stripe groups;

updates the management information in accordance with a corresponding write access to each of the stripe groups, thereby setting, as the patrol status of each of the stripe groups, a first status indicating that each of the stripe groups is not yet patrolled, the first status further indicating that each of the stripe groups is in a state of waiting to be patrolled when each of the stripe groups is assigned with the first patrol priority;

updates the management information before starting to patrol the one or more second stripe groups, thereby changing the patrol status of the one or more second stripe groups from the first status to a second status indicating that the one or more second stripe groups are not yet patrolled and are in a state of being released from waiting to be patrolled;

discriminates between a time when the one or more second strip groups are assigned with the first patrol priority and a time when the one or more third strip groups are assigned with the first patrol priority based on whether each of the one or more second and the one or more third stripe groups is in the first status or in the second status; and patrols the one or more second stripe groups having been changed to the second status earlier than the one or more third stripe groups.

5. The RAID storage system of claim 4, wherein the patrol controller updates the management information in response to completion of patrolling of each of the stripe groups, thereby changing the patrol status of each of the stripe groups from the first or the second status to a third status indicative of completion of patrolling; and updates the management information after the one or more fourth stripe groups have been patrolled but before at least one fifth stripe group assigned with the third priority is patrolled, thereby setting the first status as the patrol status of the at least one fifth stripe group.

6. The RAID storage system of claim 4, wherein the storage controller further comprises a memory, and the management information is stored in the memory.

7. A storage controller controlling access to at least one redundant arrays of independent disks (RAID) array included in a RAID storage device, the at least one RAID array having a plurality of stripe groups, each of the stripe groups comprising a set of a plurality of blocks including a redundant block, the storage controller comprising:

an input/output controller which executes one of a write access and a read access to a requested stripe group in the at least one RAID array according to an access request from a host device using the RAID storage device; and a patrol controller which patrols, using read operation, a stripe group having been subjected to the write access, earlier than other stripe groups, and, upon completion of patrolling the stripe group earlier than the other stripe groups, lowers a patrol priority indicative of order to be patrolled and assigned to the stripe group having been patrolled earlier than the other stripe groups, wherein the patrol controller assigns a first patrol priority to a first stripe group in accordance with the write access to the first stripe group, the first patrol priority being a patrol priority higher than any other patrol priorities, when patrolling the first stripe group in a state where the first stripe group is assigned with the first patrol priority, changes the first patrol priority assigned to the first stripe group to a third patrol priority in response to completion of the patrolling of the first stripe group, the third patrol priority being a patrol priority lower than the any other patrol priorities, assigns a second patrol priority to the first stripe group in accordance with the read access to the first stripe group, the second patrol priority being a patrol priority lower than the first patrol priority but higher than the third patrol priority, when patrolling the first stripe group in a state where the first stripe group is assigned with the second patrol priority, changes the second patrol priority assigned to the first stripe group to the third patrol priority in response to completion of the patrolling of the first stripe group, patrols a stripe group assigned with the second patrol priority when any stripe group assigned with the first patrol priority is absent; and patrols a stripe group assigned with the third patrol priority when both any stripe group assigned with the first patrol priority and any stripe group assigned with the second patrol priority are absent.

8. A method, in a storage controller controlling access to at least one redundant arrays of independent disks (RAID) array included in a RAID storage device, of patrolling the at least one RAID array, the at least one RAID array having a plurality of stripe groups, each of the stripe groups comprising a set of a plurality of blocks including a redundant block, the method comprising:

assigning a first patrol priority to a first stripe group in accordance with a write access to the first stripe group, the first patrol priority being a patrol priority higher than any other patrol priorities;

when patrolling the first stripe group in a state where the first stripe group is assigned with the first patrol priority, changing the first patrol priority assigned to the first stripe group to a third patrol priority in response to completion of the patrolling of the first stripe group, the third patrol priority being a patrol priority lower than the any other patrol priorities;

assigning a second patrol priority to the first stripe group in accordance with a read access to the first stripe group, the second patrol priority being a patrol priority lower than the first patrol priority but higher than the third patrol priority;

when patrolling the first stripe group in a state where the first stripe group is assigned with the second patrol priority, changing the second patrol priority assigned to the first stripe group to the third patrol priority in response to completion of the patrolling of the first stripe group;

patrolling a stripe group assigned with the second patrol priority when any stripe group assigned with the first patrol priority is absent; and patrolling a stripe group assigned with the third patrol priority when both any stripe group assigned with the first patrol priority and any stripe group assigned with the second patrol priority are absent.

\* \* \* \* \*